Oct. 11, 1938.   O. E. WOLFF   2,133,263
MACHINE FOR HANDLING SHEET MATERIAL
Filed June 11, 1938   11 Sheets-Sheet 1

Inventor.
Otto Edward Wolff
by David Rines
att'y.

Oct. 11, 1938.  O. E. WOLFF  2,133,263
MACHINE FOR HANDLING SHEET MATERIAL
Filed June 11, 1938  11 Sheets-Sheet 4

Inventor.
Otto Edward Wolff
by David Rines
Atty.

Oct. 11, 1938.  O. E. WOLFF  2,133,263
MACHINE FOR HANDLING SHEET MATERIAL
Filed June 11, 1938   11 Sheets-Sheet 5
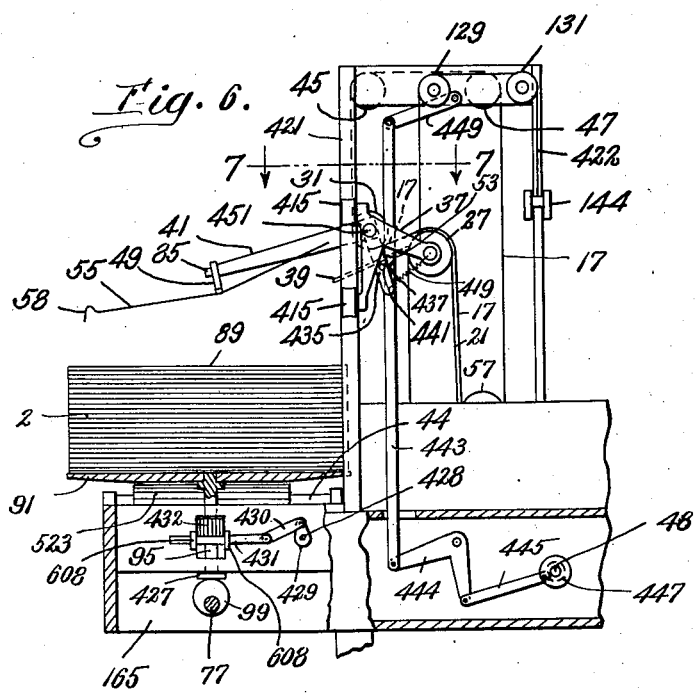
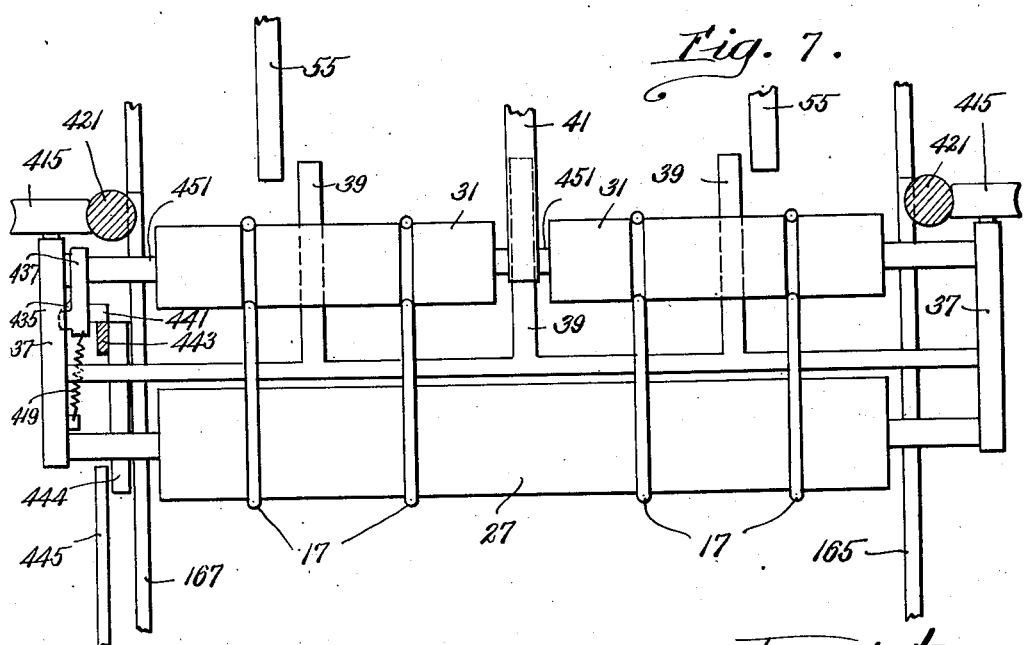
Inventor
Otto Edward Wolff
by David Rines
atty.

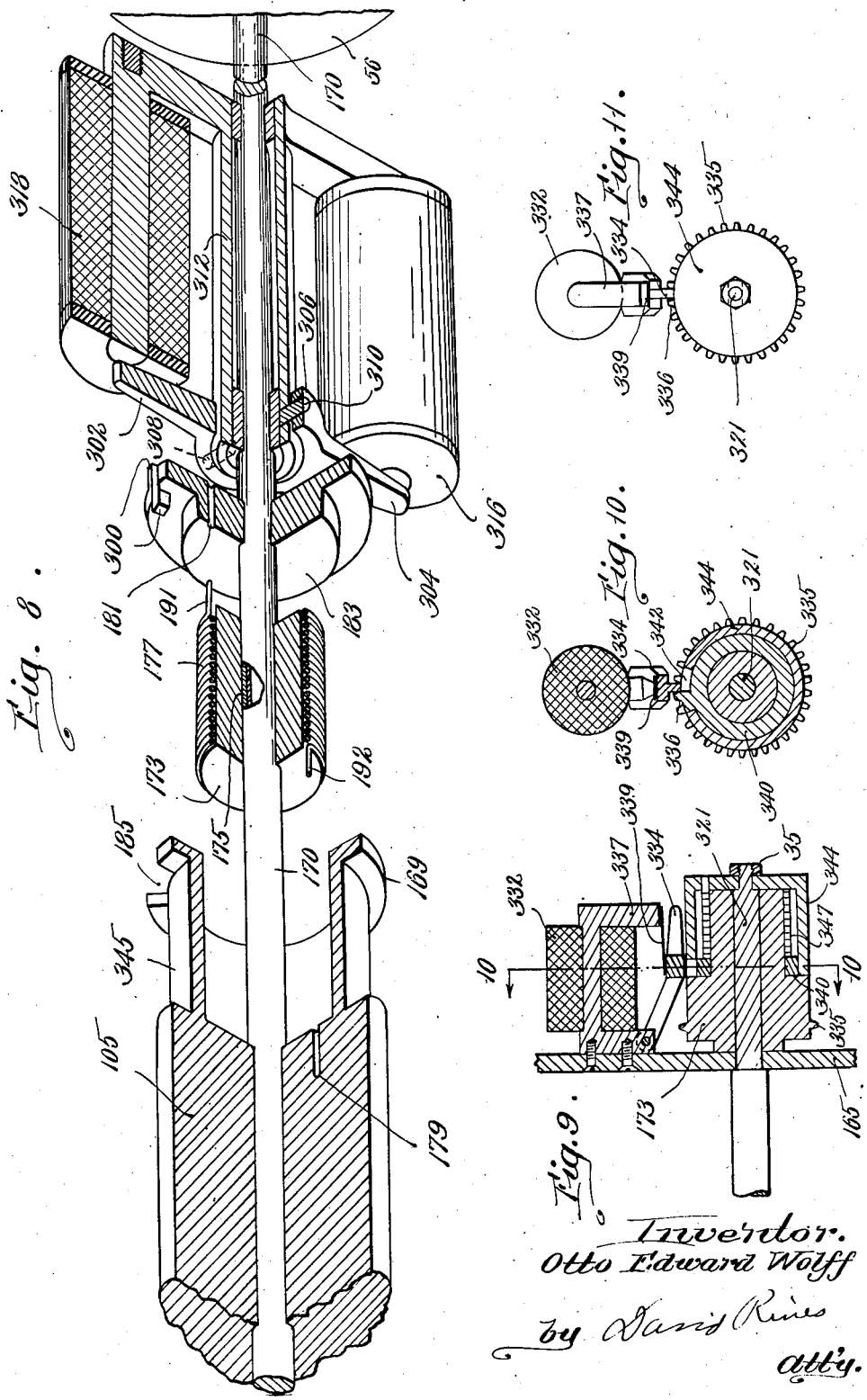

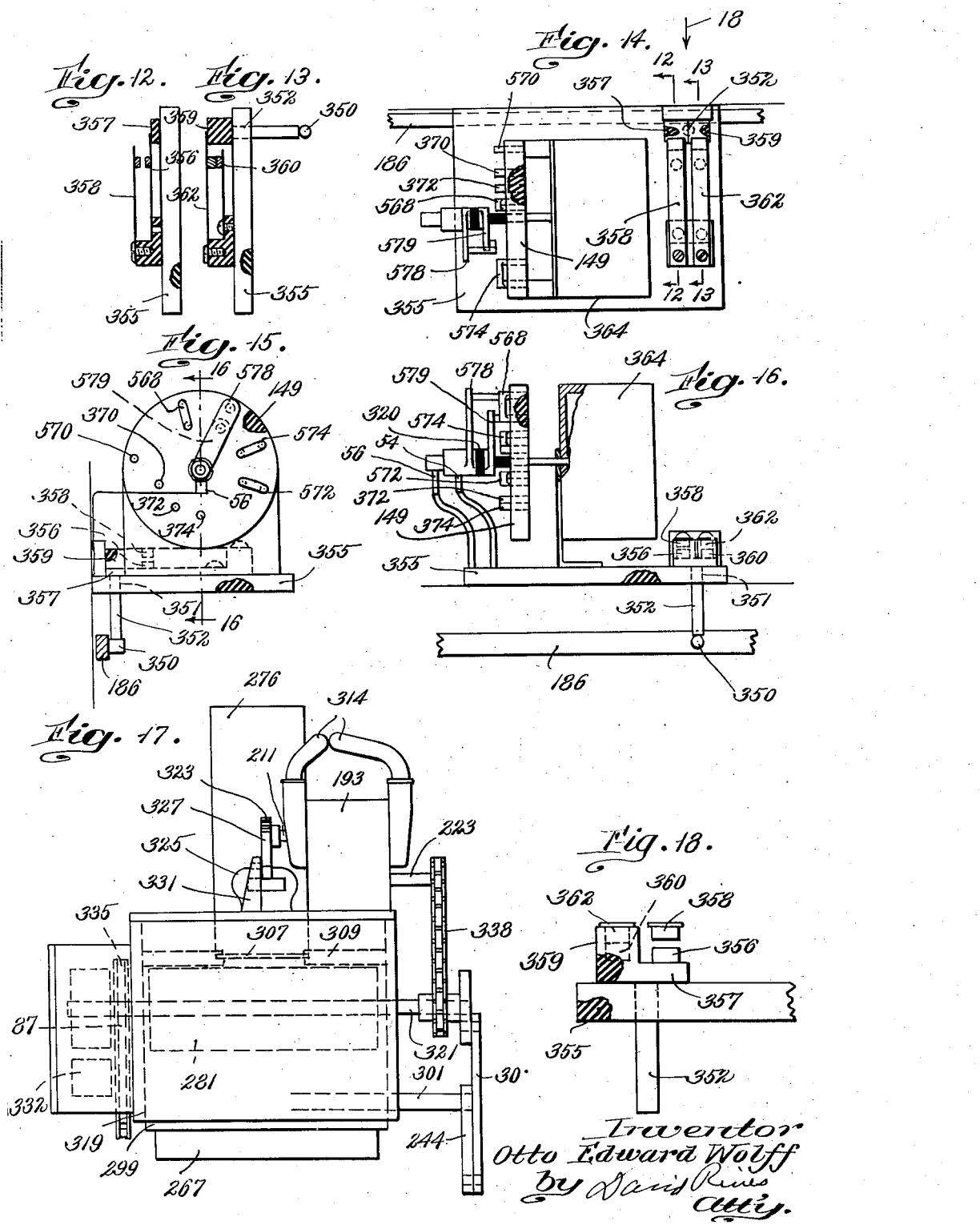

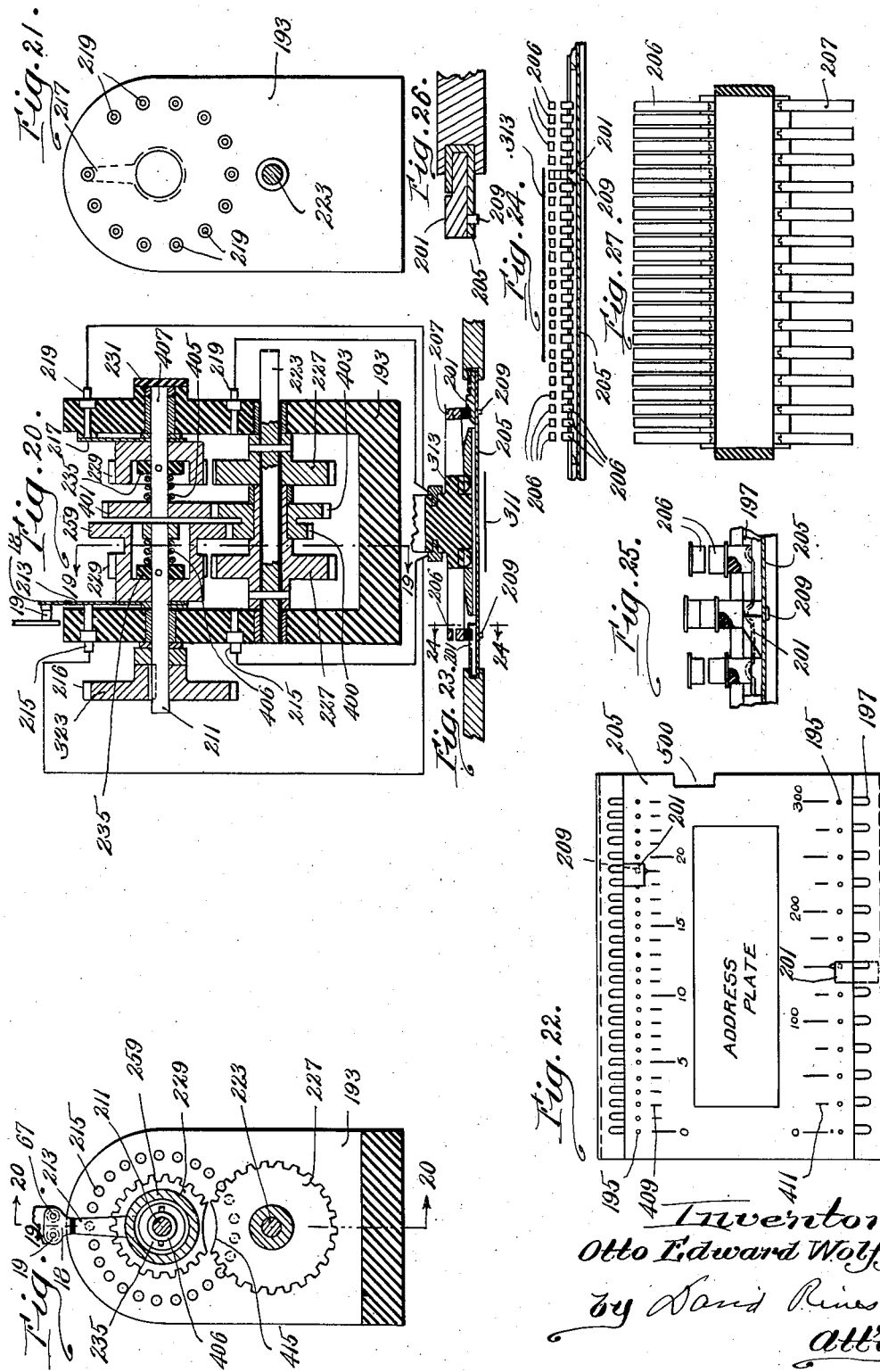

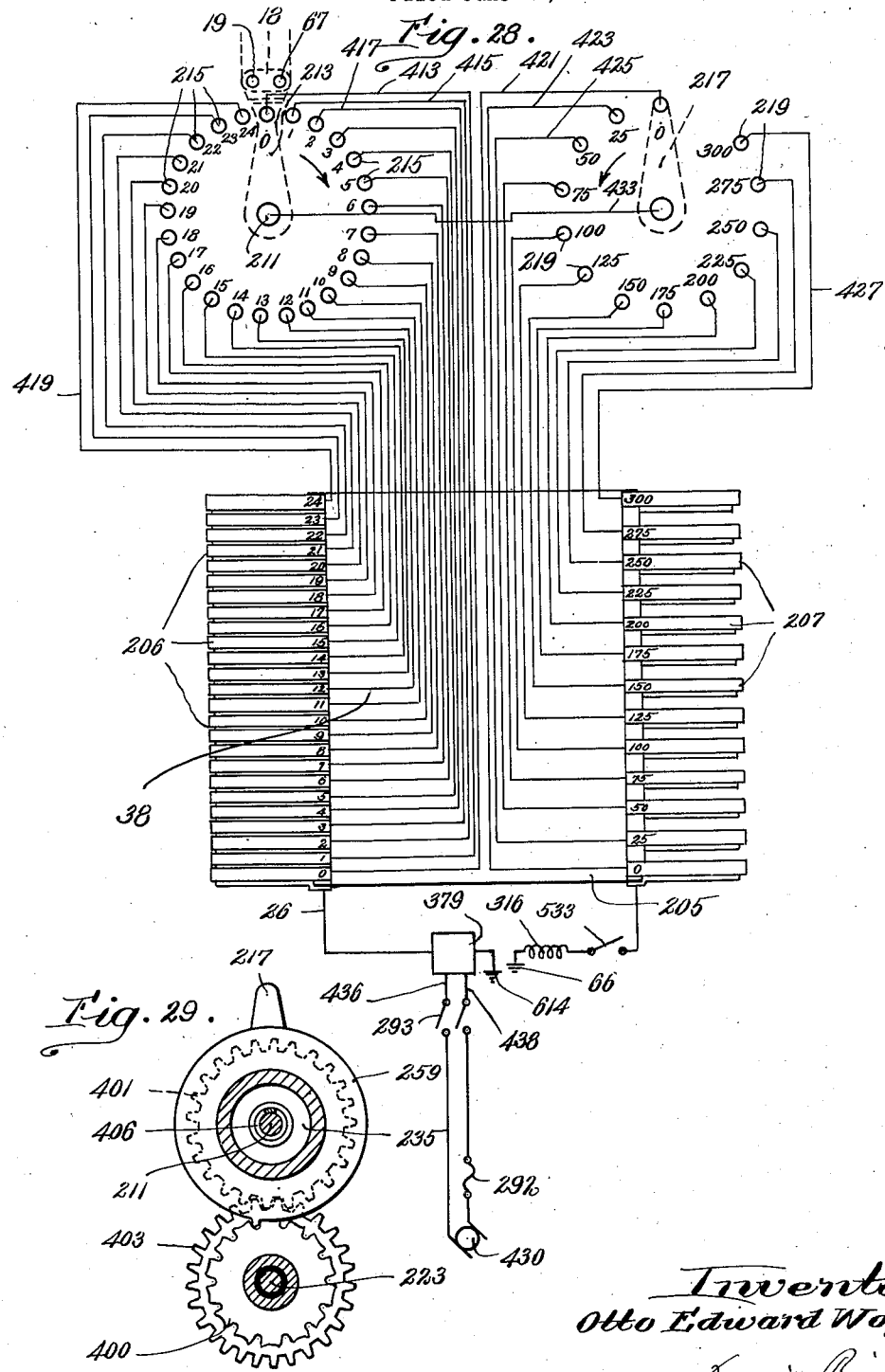

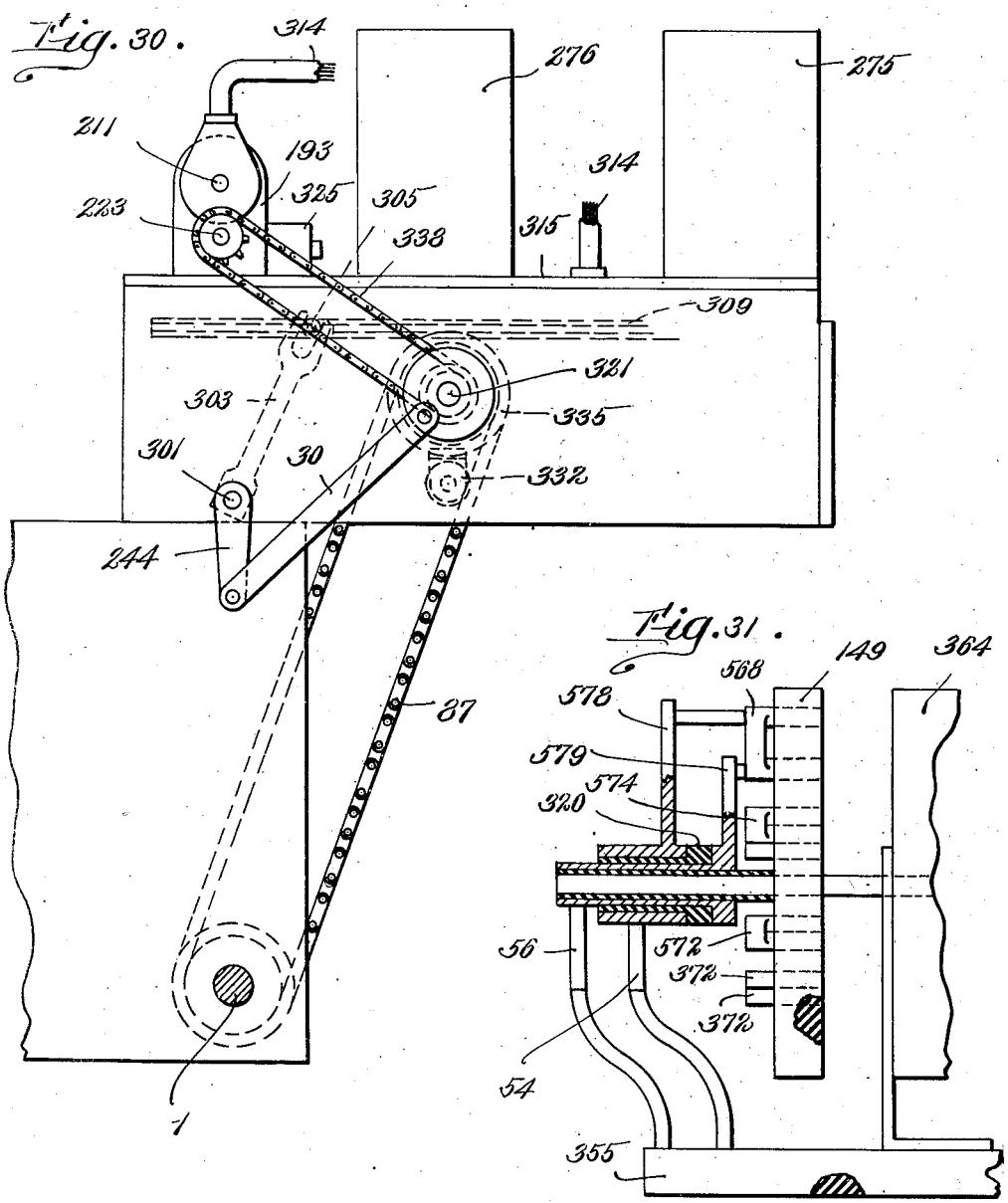

Patented Oct. 11, 1938

2,133,263

UNITED STATES PATENT OFFICE 2,133,263

MACHINE FOR HANDLING SHEET MATERIAL

Otto Edward Wolff, Arlington, Mass., assignor to Paul S. Bauer, Belmont, Mass., trustee of the R. S. Bauer Trust Application June 11, 1938, Serial No. 213,173

88 Claims. (Cl. 93—93)

The present invention relates to machines for handling sheet material, and more particularly such sheet material as newspapers and periodicals.

In copending applications, Serial Nos. 43,928 and 104,628, respectively filed on October 7, 1935, and October 8, 1936, of the latter of which the present application is a continuation-in-part, there are disclosed machines for collecting, into bundles or stacks, newspapers as they are delivered from the press, or returned newspapers, magazines and the like. The newspapers are first automatically separated out from a hopper, after which they are counted, in order that the bundles or stacks shall contain predetermined numbers of newspapers to be forwarded to various newsdealers, on order. The values of these predetermined numbers, which are different for the different newsdealers, are determined by suitably designed plates, which may be address plates, one corresponding to each newsdealer. As disclosed in application, Serial No. 104,628, the same type of plate may be employed for all the various newsdealers, but provided with adjustable lugs the adjustment of which corresponds to different numbers.

The present application contains claims directed to features of novelty more particularly related to the delivery end of the machine, and an object of the invention is to provide novel guide-raising, table-rotating-and-lowering, and other mechanism for use more particularly at such delivery end of the machine.

A further object of the invention is to provide a new and improved machine for collecting the papers in stacks each constituted of groups, with the papers of adjacent groups facing in opposite directions.

Other and further objects will be explained hereinafter, and will be particularly pointed out in the appended claims.

The invention will now be explained in connection with the accompanying drawings, in which Fig. 1 is a longitudinal vertical section of a machine embodying the present invention, in preferred form, the section being taken upon the line I—I of Fig. 3, looking in the direction of the arrows, a stack of newspapers being shown accumulated on the stack-receiving table at the right of the machine;

Fig. 6 is a longitudinal vertical section, taken upon the line I—I of Fig. 3, of the delivery end of the machine, looking in the direction opposite to the direction of the arrows, the table at the delivery end of the machine, with the stack of papers thereon, being shown turned through a quarter-revolution compared to the showing of Fig. 1;

Fig. 7 is a horizontal section taken upon the line 7—7 of Fig. 6, looking downward, in the direction of the arrows, but upon a larger scale, many parts of the machine being omitted, for clearness;

Fig. 8 is an exploded perspective, upon a larger scale than in Fig. 1, of parts of the clutch mechanism for actuating the cam-operating shaft for controlling the feed;

Fig. 9 is a vertical section, taken upon the line 9—9 of Fig. 2, looking in the direction of the arrows, but upon a larger scale;

Fig. 10 is a vertical section, taken upon the line 10—10 of Fig. 9, looking in the direction of the arrows;

Fig. 11 is an end view of the mechanism shown in Fig. 9, as viewed from the right-hand side;

Figure 1:
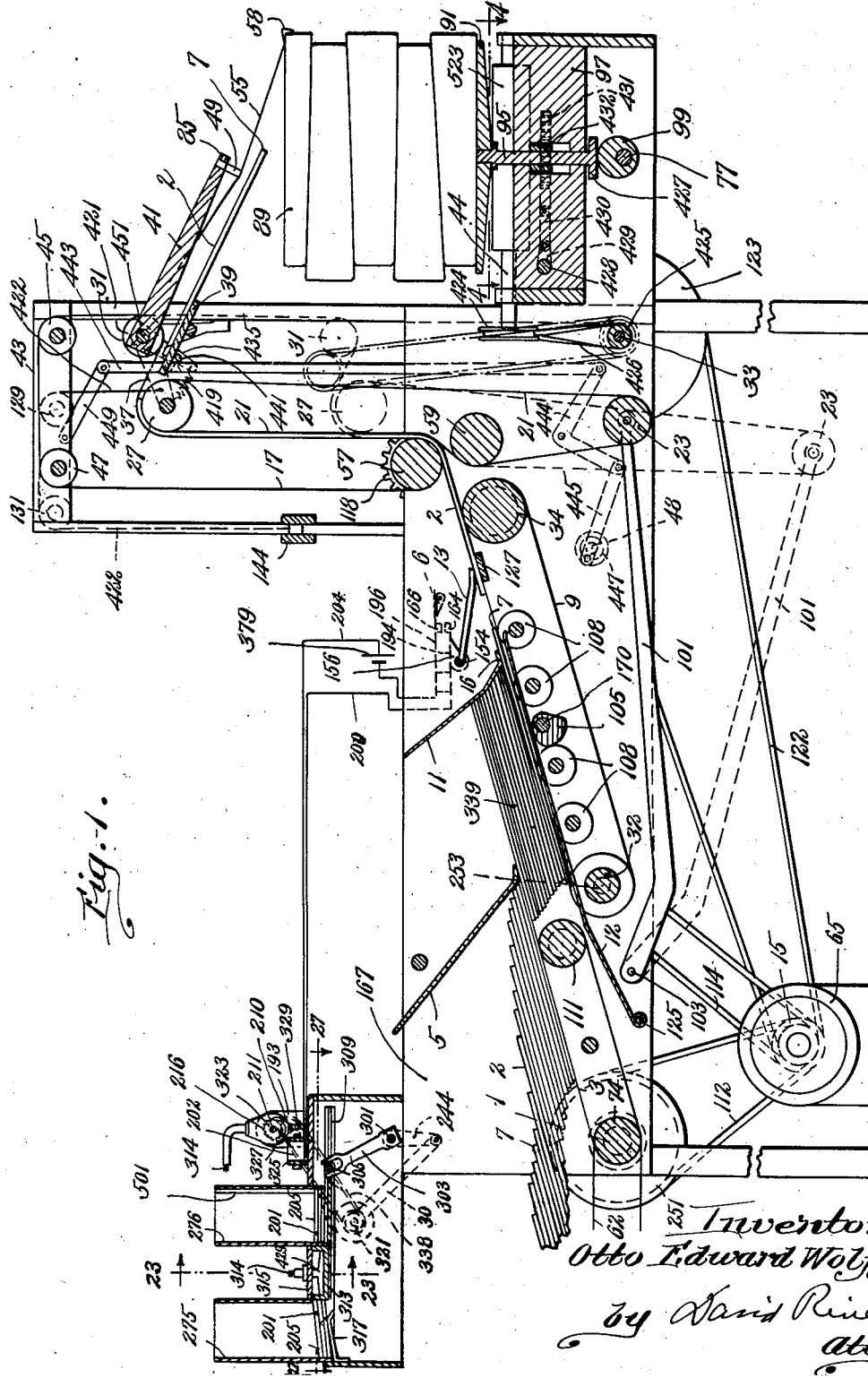
Figure 2:
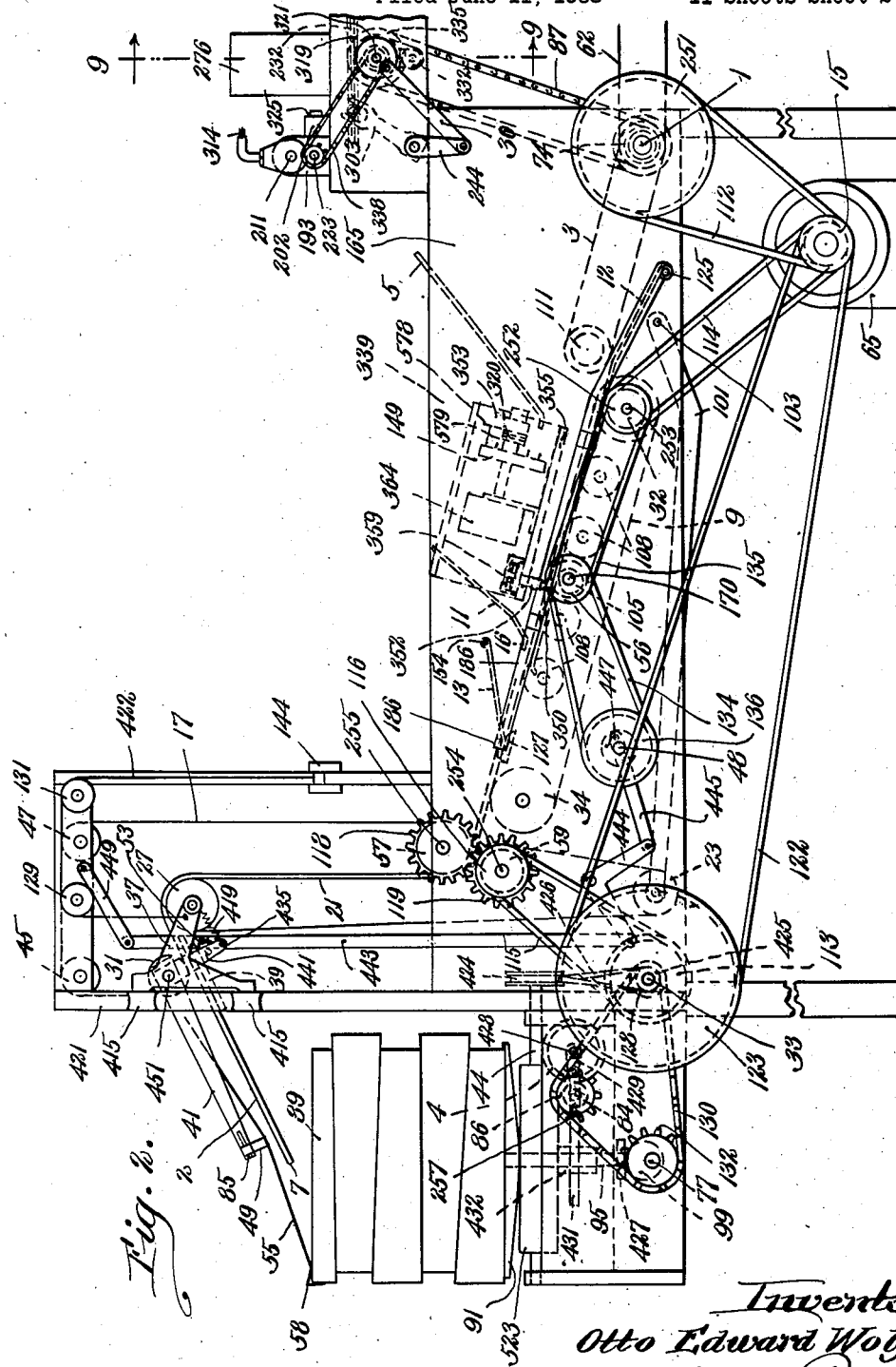
Fig. 2 is a corresponding side elevation, looking in the opposite direction.
Figure 32:
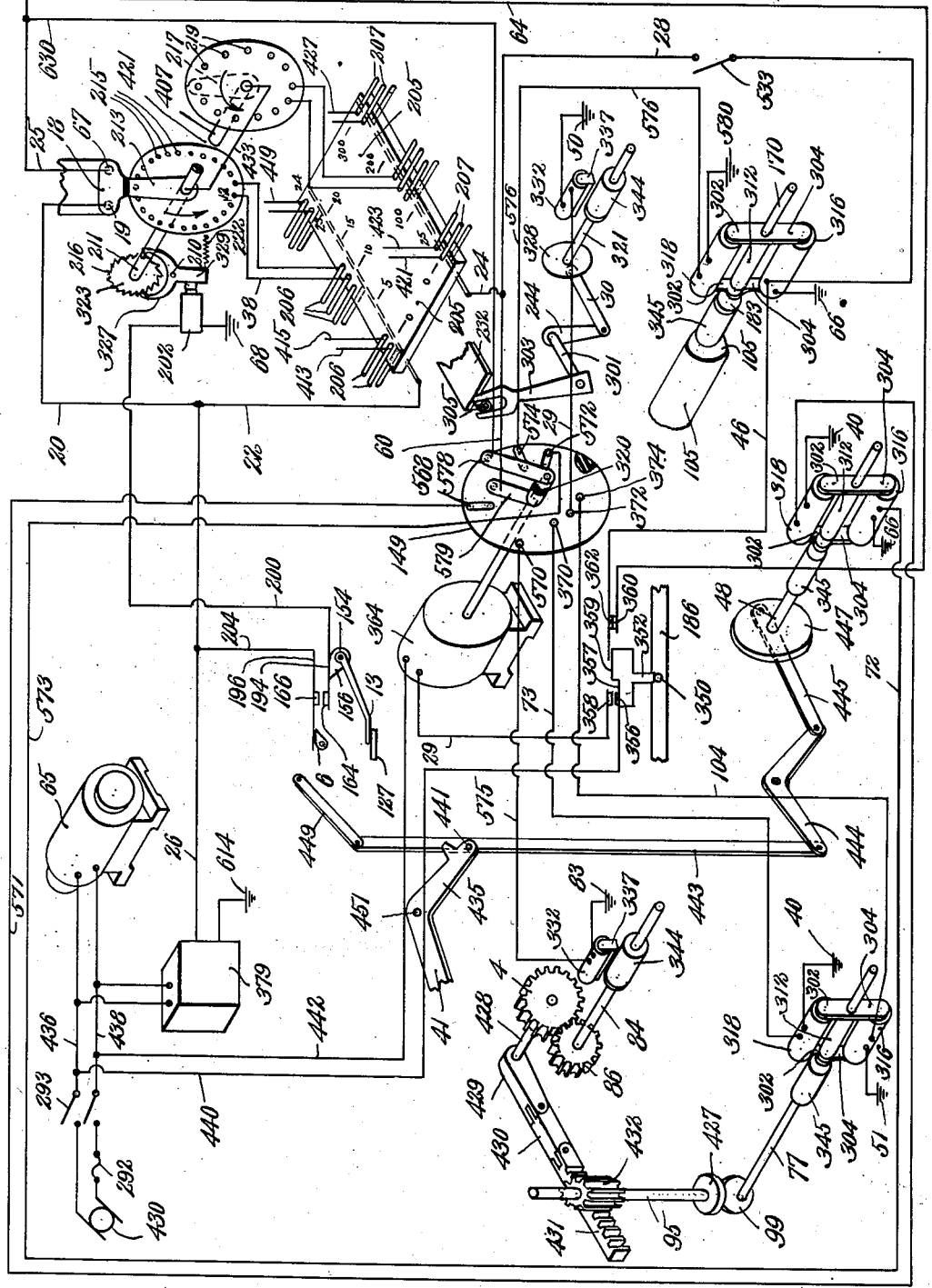

Figs. 12 and 13 are sections, taken upon the lines 12—12 and 13—13, respectively, of Fig. 14, looking in the direction of the arrows;

Fig. 14 is a plan view of the control drum and related parts;

Fig. 15 is a corresponding end view, looking from the left, in Fig. 14;

Fig. 16 is a corresponding elevation, partly in section upon the line 16—16 of Fig. 15, looking in the direction of the arrows, and partly broken away;

Fig. 17 is an end view of a preferred selector mechanism;

Fig. 18 is a view of a detail, looking in the direction of the arrow 18 of Fig. 14;

Fig. 19 is a vertical section of the selector mechanism, taken upon the line 19—19 of Fig. 20, looking to the left, in the direction of the arrows;

Fig. 20 is a vertical section taken upon the line 20—20 of Fig. 19, looking in the direction of the arrows;

Fig. 21 is a corresponding end view, looking toward the right of Fig. 20;

Fig. 22 is a plan of an address plate;

Fig. 23 is a vertical section taken upon the line 23—23 of Fig. 1, but upon a larger scale, looking in the direction of the arrows;

Fig. 24 is a vertical section taken through the contacts 206 shown in Fig. 23;

Fig. 25 is a detail view of the mechanism shown in Fig. 24, but upon a larger scale;

Fig. 26 is an enlarged sectional detail of a portion of the mechanism shown in Fig. 23, but upon a smaller scale;

Fig. 27 is a horizontal section taken upon the line 27—27 of Fig. 1, but upon a larger scale, looking downward, in the direction of the arrows;

Fig. 28 is a circuit diagram of the selector and related mechanism, with parts of the apparatus shown by dotted lines;

Fig. 29 is a section taken upon the line 19—19 of Fig. 20, looking to the right, in a direction opposite to the direction of the arrows;

Fig. 30 is an elevation, upon a larger scale, of the right-hand portion of the machine, as viewed in Fig. 2;

Fig. 31 is a similarly enlarged view of a portion of the control drum and related parts, as shown on a smaller scale in Fig. 16; and Fig. 32 is a circuit diagram.

A plurality of newspapers 2 are shown in Fig. 1 in lapped relation, upon inclined continuously traveling conveyor belts 3, mounted over pulleys 74 and 111, the former mounted upon a shaft 1. The left-hand ends (as shown in Fig. 1) of the inclined conveyor belts 3 may be disposed adjacent to a newspaper press (not shown), a stack of newspapers (not shown), another conveyor 62, or any other source of supply of newspapers. The belts 3 receive the newspapers 2 from the source of supply and feed them under a lower projecting finger of an inclinedly disposed shield wall 5, disposed in the path of travel of the papers, just beyond the right-hand ends of the conveyor belts 3, into a hopper 339, between the wall 5 and a similarly inclinedly disposed shield wall 11. The shield wall 11 is also disposed in the path of travel of the papers, as will hereinafter appear, and its lower end is provided with a similar lower projecting finger 16.

Though the machine is shown in connection with newspapers, preferably fed with one of the folded edges 7 forward, it will be understood that other sheet material, such as magazines and other periodicals, may also be treated in this machine, or parts thereof; and the terms "newspaper", "paper", "sheet", and the like, will therefore, to avoid circumlocution of language, be often employed in the specification and the claims, in this generic sense, except where the context or the state of the art requires otherwise.

Figure 3:
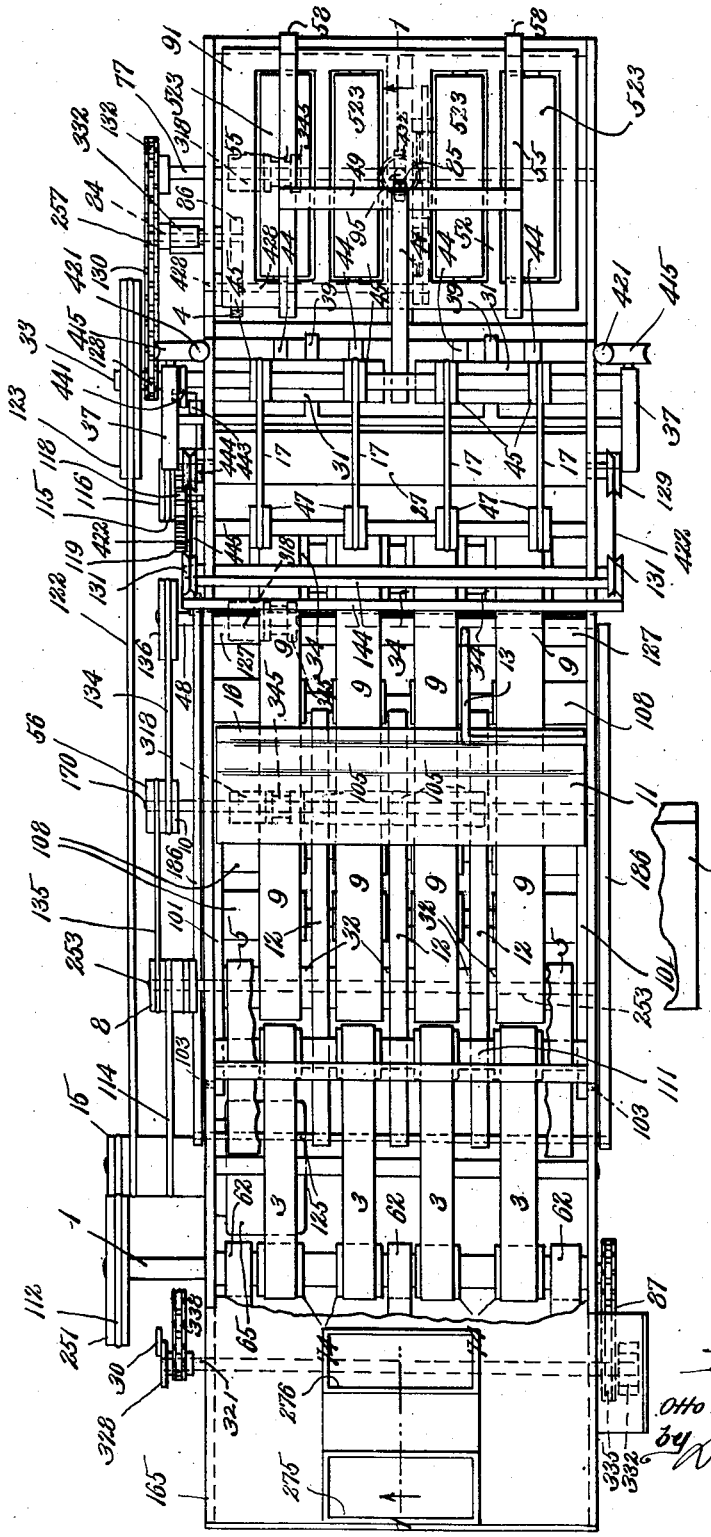
Fig. 3 is a corresponding plan, but with the stack of newspapers omitted, and with parts broken away, for clearness.
Figure 4:
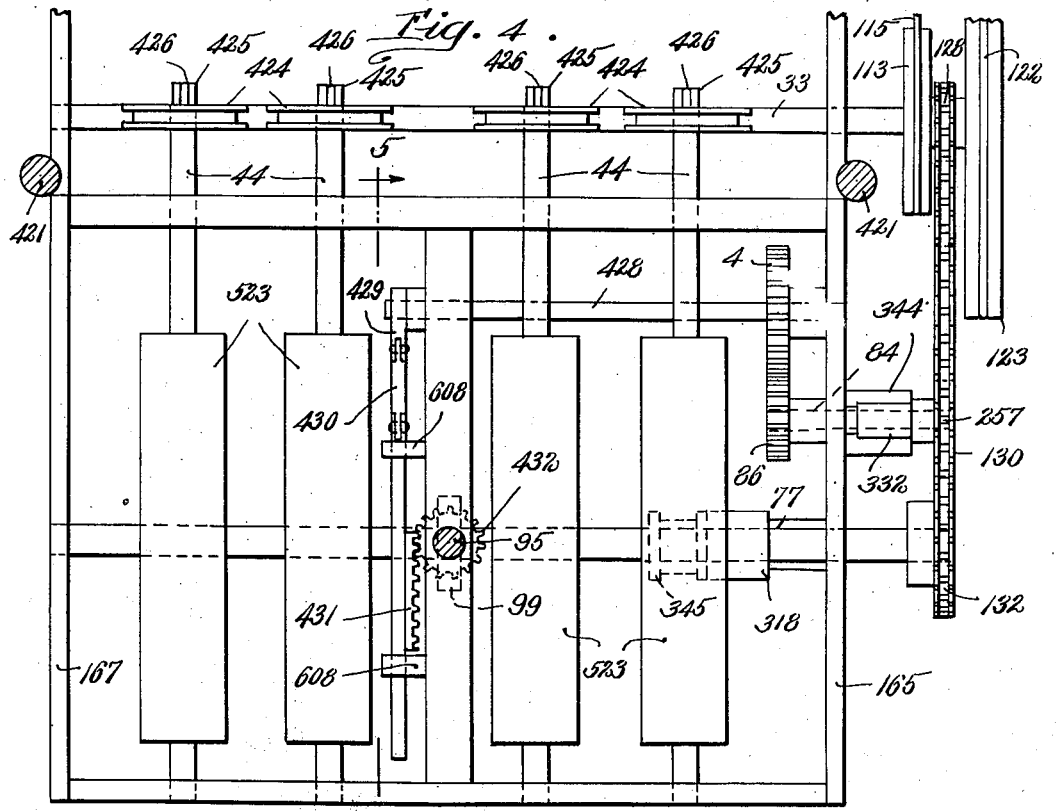
Fig. 4 is a horizontal section taken upon the line 4—4 of Fig. 1, looking downward, in the direction of the arrows, but upon a larger scale than in Fig. 1.
Figure 5:
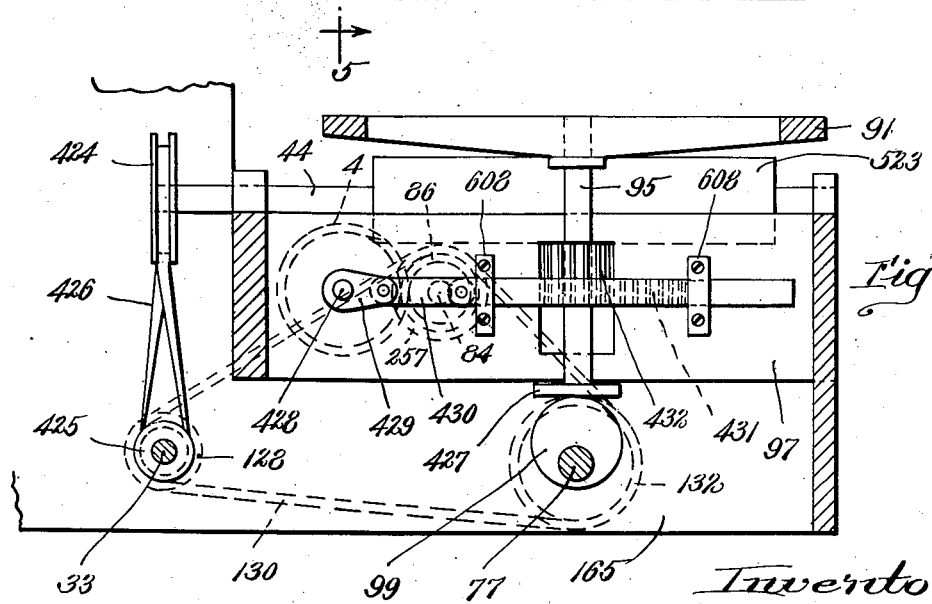
Fig. 5 is a vertical section taken upon the line 5—5 of Fig. 4, looking in the direction of the arrows.

If the hopper 339 is empty, the newspapers 2 are conveyed thereinto by the conveyor 3 under the shield wall 5, and on to a conveyor that is disposed at the bottom of the hopper 339, constituted of inclinedly disposed continuously traveling belts 9. The belts 9 are spaced slightly below the said projecting finger 16, but the space or gap or opening between them may be blocked or closed, as hereinafter described. The number of belts 9 is shown in Fig. 3 as four, with spaces between them. The belts 9 travel continuously forward, at a higher speed than the belts 3, over pulleys 32 and 34 and idler rolls 108. The pulleys 32 are mounted upon a shaft 253, adjacent to the right-hand ends of the inclined conveyor belts 3, at the left-hand end of the hopper 339, as viewed in Fig. 1. The pulleys 34 are disposed a considerable distance to the right, beyond the confines of the hopper 339.

As the first newspaper 2 is delivered by the conveyor belts 3 into the hopper 339, it is carried by the belts 9 forward, or toward the right, as viewed in Fig. 1. When the said space or opening between the finger 16 and the belts 9 is blocked or closed, this first newspaper 2 will engage the shield wall 11, so that the further progress of this first newspaper 2 will be temporarily blocked. The second newspaper 2 is similarly carried forward, to the right, on top of the first newspaper 2, until its further progress is similarly blocked. The third newspaper 2 is similarly carried forward, to the right, on top of the second newspaper, into similar engagement with the wall 11, and so on.

The conveyor 3 continues thus to feed the papers 2, in superposed relation, into the hopper 339, until the level of the stack of papers thus accumulated therein is high enough to touch the bottom projecting finger of the shield 5, as shown more particularly in Fig. 1. As no more sheets can then be fed past the shield 5, the level of papers on the belt 3 in the hopper 339, and their consequent weight upon the belts 9, will be practically constant.

When the said space between the finger 16 and the belts 9 becomes opened, as will be explained more fully hereinafter, the conveyor belts 9 will feed the lowermost newspapers 2 in the hopper 339 forward, under the shield 11 and into the space outside, to the right of the hopper 339, as viewed in Fig. 1. The next-lowest paper will then be simularly fed out of the hopper 339, and so on. The shield wall 11 may be made adjustable to regulate the said space between the finger 16 and the belts 9, thereby to control the number of newspapers 2 passing thereunder at any one time.

It is usually preferred to have only one newspaper at a time pass out of the hopper 339, under the finger 16. To effect this result, the said space near the belt conveyor 9, under the finger 16, should be adjusted so as to be less than the thickness of two newspapers, so that the second newspaper from the bottom shall be caught by the sloping, inner wall of the inclined finger 16, as illustrated more particularly in Fig. 1. As a slight space or opening separating the lower end of the sheet above the conveyor 9 will suffice to pass the sheets singly, the lower end of the shield wall 11 of the hopper 339 may be disposed very close to the conveyor 9.

After the papers have thus been caused to travel out of the hopper 339, they are fed further forward toward a table 91, on which they become accumulated in the form of a stack 89. During the feeding of the papers out of the hopper 339, and before they reach the table 91, they are counted. As each newspaper 2 advances from left to right, as viewed in Fig. 1, out of the hopper 339, its forward edge 7 engages, and passes under, a counting finger 13, disposed above the right-hand portions of the belts 9. The finger 13 is integrally fixed to a horizontally disposed shaft 154, about which it is pivotally actuated toward the right by the traveling newspapers, becoming thus raised, in opposition to the force exerted by a two-way leaf spring 194, above a supporting plate 127 upon which the finger 13 normally rests.

The two-way leaf spring 194 carries a contact member 164 that, as illustrated more particularly in Figs. 1 and 32, is normally separated from a cooperating contact member 166, carried by a two-way leaf spring 196. The leaf spring 196 is normally biased, so as normally to contact with a limiting stop 6. In response to each pivotal raising of the finger 13 by the successive papers 2, as they travel out of the hopper 339, a cam 156, that is fixed to the pivotal shaft 154, effects engagement of the contact member 164 with the contact members 166, raising the leaf spring 196 out of contact with the limiting stop 6. The spring 194 continuously engages the cam 156 to force the finger 13 back into contact with its supporting plate 127 after each paper has traveled on beyond it, toward the table 91.

Each raising and lowering of the counting finger 13 will result in registering a count, as will be hereinafter explained, to indicate that another newspaper 2 has been conveyed by the conveyor belts 9 from out of the hopper 339, and stacked on the table 91.

The contact member 164 is connected, through the leaf spring 194, to a conductor 200, and the contact member 166, through the leaf spring 196, to a conductor 204. The contact member 166 is connected, as illustrated in Figs. 1 and 32, by way of the leaf spring 196 and the conductor 204, to one side of a counter-controlling electromagnetic coil 202. The coil 202 is mounted upon a magnet core 325 provided with an armature 329, that is intermediately pivoted at 210. The contact member 164 is diagrammatically shown, in Fig. 1, as similarly connected, by way of the leaf spring 194 and the conductor 200, to the other side of the counter-controlling electromagnetic coil 202. In Fig. 32, the connection is shown through the medium of a conductor 26, and grounds 614 and 68, through a rectifier-and-filter 379, which is diagrammatically represented in Fig. 1 by a battery.

At each closing of the contact members 164 and 166, in response to the actuation of the counting finger 13, the circuit of the counter-controlling electromagnetic coil 202 becomes closed, by way of the conductors 200 and 204 to control the actuation of a counter 323. The counter 323 is shown as a ratchet wheel, provided with slightly offset ratchet teeth 216. This ratchet wheel 323 is fixed to a counter shaft 211 that extends into the frame of a selector housing 193. The shaft 211 is thus driven from the counter 323.

Continuous rotative movement of the counter wheel 323 is prevented by a spring-controlled ratchet double pawl 327 that is integral with the armature 329, so as to be pivoted therewith, at 210. The pawl 327 is provided at its ends, on opposite sides of its pivot 210, with two oppositely acting pawl teeth for engaging the ratchet teeth 216 of the ratchet counter wheel 323. One of the teeth of the ratchet pawl 327 is held normally in engagement with a ratchet tooth 216 of the counter wheel 218 by a spring, diagrammatically shown in Fig. 32 at 222. Upon the closing of the circuit of the electromagnetic coil 202 by the contact members 164 and 166, in response to the actuation of the counting finger 13, the armature 329 will be actuated by the energized coil 202 about its pivot 210, clockwise, as viewed in Figs. 1 and 32, in opposition to the action of the spring 222. The pawl 327 will be rocked about the pivot 210 with the armature 329 upon which it is mounted, effecting the separation of the said pawl tooth of the ratchet pawl 327 from the said ratchet tooth 216. The other tooth of the pawl 327 is, at the same time, actuated into engagement with another tooth 216, at the opposite side of the ratchet wheel 323. The next moment, the finger 13, as the paper 2 thereunder passes beyond it, will be actuated by the spring 194 to effect the actuation, in the opposite direction, of the cam 156, and the consequent separation of the contact members 164 and 166. This will result in the opening of the circuit of the coil 202. The spring 222 will thereupon rock the pawl 327 in the opposite direction, counter-clockwise, as viewed in Figs. 1 and 32, to cause the said other pawl tooth of the pawl 327 to release its tooth 216, and the first-named tooth of the pawl 327 to engage another tooth 216 of the ratchet wheel 323. The double pawl 327 is thus actuated with the armature 329 by the magnet coil 202 and the spring 222 like an ordinary escapement pawl, with its pawl teeth engaging oppositely disposed teeth 216 of the ratchet wheel 218 alternately. The counter wheel 323 is, therefore, rotated step-by-step by the pawl 327, through successive angular distances corresponding to one tooth 216 for each paper 2. Successive movements of the counting wheel 323, tooth by tooth, one tooth at a time, may become thus registered on a dial (not shown), to register a total count corresponding to the total number of papers 2 fed by the conveyor 9 out of the hopper 339. The counting wheel may make a 25th of a revolution for each paper counted.

The shaft 211 rotates a contact arm 213 (Figs. 19, 20, 28 and 32) over, so as successively to engage, 25 contact members 215 that are disposed in a circular row, and that are numbered 0 to 24 in Fig. 28. A contact arm 217 is similarly adapted successively to engage 13 contact members 219 that are disposed in a second circular row, and that are marked 0, 25, 50, 75, 100, 125, 150, 175, 200, 225, 250, 275 and 300 in Fig. 28. The connection between the arm 213 and the shaft 211 is frictional, through the medium of a disc clutch 235 that is pressed, by a spring 406, against an intermittent gear member 259 (Fig. 20) fixed to the contact arm 213. All the contact members 215 will be successively engaged in the course of one revolution of the arm 213. The gear member 259 is so arranged with reference to a train of gears 400, 403 and 401 that, as the arm 213 passes from the 24 contact member 215 to the 0 contact member 215, it will actuate the contact arm 217 through the intermittent gearing, 1/14th of a revolution, from one contact member 219 to the next contact member 219. The gears 400 and 403 are integrally connected together, the former meshing with the gear member 259 and the latter with the gear 401. The gear 401 is mounted upon a shaft 407 that drives the contact arm 217 frictionally, in the same manner that the shaft 211 drives frictionally the contact arm 213, through the same kind of clutch 235, pressed by a spring 405 against an intermittent gear member 229 to which the contact arm 217 is fixed.

The circuits of the contact members 215 and 219, respectively, as will hereinafter appear, are further controlled by previously closed pairs of contact members 206, 207 under the control of the lugs 201 on the address plates 205.

As shown arbitrarily, there are twenty-five pairs of contact members 206, numbered 0 to 24 in Fig. 23, and thirteen pairs of contact members 207, marked 0, 25, 50, 75, 100, 125, 150, 175, 200, 225, 250, 275 and 300 in the same Fig. 28. The maximum count of the unit row 206, therefore, is 24, the 25th and its multiples being counted off on the group row 207. Any number may, of course, be applied to each row, but in the case of newspapers, 25 is convenient as they are turned in groups of 25 or multiples of 25.

Two rows of contact members 206 and 207 are shown because, for the quantity to be covered, accuracy and convenience could not be obtained by placing 300 contact members in one row. The contact arm 213 constitutes a units-counter control, cooperating with the contact members 206, and the contact arm 217 constitutes a multiple-counter control, counting by multiples of 25, and cooperating with the contact members 207. The contact arm 213 may, therefore, be referred to as the units counter and the contact arm 217 as the multiple counter.

Each of the contact members 215 is wired to one of the sets of contact members 206, and each of the contact members 219 is wired to one of the sets of contact members 207, as shown in Figs. 28 and 32. The first or 0 contact member 215, for example, is connected by a conductor 413 with the first or 0 pair of contact members 206; the second or 1 contact member 215, by a conductor 415, with the second or 1 pair of contact members 206; the third or 2 contact member 215, by a conductor 417 with the third or 2 pair of contact members 206; the thirteenth or 12 contact member 215 by a conductor 36 with the thirteenth or 12 pair of contact members 206; and so on; the last or 24 contact member 215 being connected by a conductor 419 with the last or 24 pair of contact members 206. The first or 0 contact member 217 is similarly connected by a conductor 421 with the first or 0 pair of contact members 207; the second or 25 contact member 217, by a conductor 423, with the second or 25 pair of contact members 207; the third or 50 contact member 217, by a conductor 425, with the third or 50 pair of contact members 207; and so on; the last or 300 contact member 219 being connected by a conductor 427 with the last or 300 pair of contact members 207.

After leaving the counting finger 13, the papers 2 are fed into the bite between vertically disposed continuously traveling lift belts 17 and 21 of a conveyor that feeds the newspapers 2, as they are received from the hopper 339, vertically upward. The conveyor belts 17 pass over a lower pulley or roll 57, fixed upon a shaft 255, a discharge pulley or roll 27, and smaller pulleys or rolls 31, 45 and 47. The conveyor belts 21 pass over the pulley 27, an intermediately disposed pulley 59, fixed upon a shaft 254, and an idler pulley 23. To maintain tension in the belts 21, the idler pulley 23 is free to move in a vertically disposed arc at the end of arms 101 pivoted to the frame of the machine at 103.

If the inclinedly disposed conveyor belts 9 travel at a slower speed than that of the lift belts 17 and 21, the papers 2 will separate out more rapidly in the hopper 339, and congestion and buckling of the papers 2, that might be caused by slippage between the belts and the papers 2, will be avoided. The desired relative speeds may be produced in any desired manner, as explained in the said applications.

In order to maintain the point of delivery of the papers 2 above the topmost paper of the stack 89, the delivery end of the conveyor, including the upper portions of the belts 17 and 21, and the rolls 27 and 31, is disposed above the belts 9 and the table 91. The discharge pulleys or rolls 27 and 31 are carried by arm members 37 that are freely movable vertically. In this vertical movement, they are guided by wheels 415, that are carried by the arm members 37, so as to roll on a vertically disposed track of a supporting column 421.

Upon reaching the bite between the conveyor belts 17 and 21, the papers are turned upward, around the large pulley 57, and toward and over the pulley 27. Each paper 2 is then fed from above the table 91, at the left thereof, as viewed in Fig. 1, at a downward incline, on to the top of the stack 89 accumulated on the table 91. During this downwardly inclined feeding, the papers travel over a downwardly inclined guide arm or arms 39, and under downwardly inclined guide arms or members 55, toward and against stops, constituted of integrally bent portions 58 of the guide members 55. The bent portions 58 project downward, so as to be engaged by the forward edges 7 of the newspapers, to limit the further travel of the papers. The newspapers thus become successively deposited on the top of the stack 89 on the table 91, each on top of the previously deposited paper 2, in engagement with the stops 58. The stack 89 rises higher and higher as the newspapers are successively conveyed thereto, until the desired number of newspapers, as determined by the count of the counting finger 13, has been collected in the stack 89. The guide members 55 constitute part of the elevator assembly that moves up with the discharge pulleys or rolls 27 and 31 as the height of the stack 89 increases.

The guide members 55 are respectively disposed at opposite sides of the center of the stack 89 of the papers, and predetermine the position occupied by the stack 89 on the table 91. To equalize the pressure exerted by them on the uppermost sheet of the stack 89, these two guide members 55 may be separated by a yoke 49 that is pivoted at 85 to an arm 41. The guide members 55 are thus always maintained in proper position for guiding the papers to the top of the stack 89.

Through the medium of the yoke 49 and the arm 41, the freely movable rolls 27 and 31 and the arm members 37 by which they are carried, the upper portion of the conveyor 21, and related parts, are automatically raised vertically, in accordance with the height of the stack 89. This is effected by the impact of the papers, passing under the guides 55, in opposition to the force of gravity. The weight of the parts and a spring 419 normally maintain the guide arms 55 yieldingly in engagement with the top of the stack 89 and pressing yieldingly downward thereon. To reduce the upward force which the papers must exert in order to lift the guide members 55 higher and higher as they travel thereunder, a counterweight 144 is connected to the members 37 by cords 422, running over pulleys 131 and 129.

The idler pulley 23 and related parts move up and down with the delivery end of the conveyor 17, 21. The lowermost positions of the pulleys 27 and 31 and the arms 101 with the idler pulley 23 are indicated in Fig. 1 by dotted lines.

At such times as the said space under the finger 16 and above the belts 9 is blocked, so as to stop the further feed of the newspapers 2 out of the hopper 339, it is desirable that the continuously traveling belts 9 do not engage the lowermost newspaper 2 in the hopper 339. Provision is, therefore, made for lifting the stack of newspapers in the hopper 339 up, out of contact with the belts 9, in synchronism with the movements of the other parts of the machine. The mechaanism for bringing this about will now be described.

A table 12 is constituted of a plurality of bar supports respectively disposed between the belts 9. These bar supports are rigidly secured together, and to two bars 186 that are disposed outside the front and rear frame plates or walls 165 and 167, in a common frame-work, to a pivotally mounted rod 125. The table 12 normally occupies an ineffective position, below the surface of the plurality of belts of the conveyor 9, as illustrated in Fig. 1. In this ineffective position, the table 12 does not interfere with the feeding of the newspapers 2 by the belts 9 out of the hopper 339, through the said space under the finger 16. Upon the completion of a cycle of operations, immediately after every feeding of the desired predetermined number of papers 2 out of the hopper 339, the table 12 is raised pivotally as a unit about the rod 125, from its normally ineffective position, up between the belts 9, into its effective position. This may be brought about in any desired manner, as by a half-revoluton of a cam 105, mounted upon a rod or shaft 170, as more particularly illustrated in Figs. 1, 2, 3, 8 and 32. The shaft 170 is journaled in the front and rear frame plates or walls 165 and 167 of the machine. It is this raising of the table 12 that results in blocking the said gap or space under the finger 16, thus stopping the further feed of the papers out of the hopper 339, below the shield 11. It results also, however, in lifting the newspapers 2 up off the belts 9, so that the belts 9 could not further convey the newspapers out of the hopper 339 even if the said space were not blocked. Upon the lowering of the table 12 from its effective position, above the belts 9, to its ineffective position, below these belts, the feeding of the papers 2 out of the hopper 339 by the belts 9 recommences, and the machine goes through another cycle of operations.

The raising of the table 12, upon the completion of each cycle of operations, is automatically effected by the cam 105, in synchronism with the operation of the rest of the machine. It is similarly automatically lowered at the commencement of a new cycle of operation, and also, when first starting the machine into operation, upon the closing of a line switch 293 (Fig. 32), through the medium of circuit connections described hereinafter.

The feeding and stacking of the papers 2 may be stopped manually at any time by opening the switch 293. By opening a switch 533 in the circuit of a lower table-raising electromagnetic coil 316, the machine will be permitted to continue feeding the papers out of the hopper 339 until the hopper is completely emptied.

The pivotally mounted rod 170, upon which the cam 105 is mounted, is actuated through semi-revolutions by means of the lower table-raising electromagnetic coil 316 and an upper table-lowering electromagnetic coil 318, shown more particularly in Fig. 8, and diagrammatically in Fig. 32. The circuits of these electromagnetic coils 316 and 318, as well as of other electromagnetic coils illustrated herein, are opened and closed, as described hereinafter, and also at considerable length in the said applications, by the counter-and-selector mechanism, under the control of the counting finger 13. One semi-revolution of the shaft 170, in response to energization of the coil 316, at the end of a cycle of operations, results in the cam 105 raising the table 12 to stop the feed. The next semi-revolution of the shaft 170, in response to the energization of the coil 318, at the commencement of a new cycle of operations, results in the lowering of the cam 105, and the consequent lowering of the table 12 by gravity, whereupon the feeding of the papers 2 out of the hopper 339 by the belts recommences.

A drum 173 is fixed to the shaft 170, as shown more particularly in Fig. 8, by means of a Woodruff key 175. A half-revolution of the drum 173 will, therefore, result in raising the table 12 to its effective position, so as to close the gap under the finger 16, as before described, to stop the feed of the papers out of the hopper 339, and a further half-revolution of the drum 173 will result in relowering the table 12 to its ineffective position. These half-revolutions are effected by clutching the drum 173 to a cylindrical barrel 345 to which the cam 105 is integrally secured, and that is normally mounted loosely on the shaft 170, so as to be free to turn thereon. The barrel 345 serves also as a housing for the drum 173. The drum 173 is constantly rotated, at constant speed, from a pulley 56 (Figs. 2, 3 and 8) that is mounted at one end of the shaft 170. The clutching of the barrel 345 to the constantly rotating drum 173 is effected by means of a coiled spring 177 that is wound around the outside of the drum 173. One end 192 of the spring 177 is held in a hole 179 in the cam 105, and the other end 191 is held in a hole 181 of a collar or disc 183 that normally is loosely mounted on the shaft 170, so as to turn freely thereon.

When the spring 177 is free to do so, it will, through its own resiliency, engage and wind itself tightly about the constantly rotating drum 173, so as to become tensioned thereagainst, by friction. The spring 177 will then be caused to rotate with the drum 173, carrying with it the collar 183 and the barrel 345, and thereby effecting the rotation of the cam 105, to which the barrel 345 is integrally secured. The tensioned spring 177 thus effects the clutching of the shaft 170 to the cam 105 so as to become rotated from the pulley 56. The cam 105 becomes unclutched from the constantly rotating drum 173 when the spring 177 is caused to unwind itself therefrom. The mechanism for effecting this winding and unwinding of the spring 177 and the consequent intermittent clutching and unclutching of the cam 105 will now be described.

A lower armature 304 cooperates with the lower table-raising electromagnetic coil 316, and an upper armature 302 cooperates with the upper table-lowering electromagnetic coil 318, as illustrated in Fig. 8. The armatures 302 and 304 are disposed opposite to each other, at the upper and lower ends of a yoke 306 that is pivoted to move to the right and to the left, as viewed in Fig. 8, about pivots 308 and 310, that enter suitable journals in the central common core 312 of the magnetic coils 316 and 318.

At times when the circuit of the lower electromagnetic coil 316 is closed, the circuit of the upper electromagnetic coil 318 is open, and vice versa. The energization of the upper electromagnetic coil 318 will result in pivotal actuation of the upper armature 302 to the right, and the lower armature 304 to the left, as viewed in Fig. 8, about the pivots 308 and 310; and the energization of the lower electromagnetic coil 316 will result in similar actuation of the armatures 302, 304 in the opposite directions.

Near the circumference, a lug 300 extends though both faces of the disc 183. The right-hand end of the lug 300, as viewed in Fig. 8, is adapted to be engaged either by the upper armature 302 or the lower armature 304, depending upon which of them has been actuated toward the left, as viewed in Fig. 8. The lug 300 becomes released from its engagement with the corresponding armature 302 or 304, however, when that particular armature becomes pulled over toward the right by its actuating coil 318 or 316, respectively. The lug 300 will thereupon become rotated, by the spring 177, into engagement with the other armature 304 or 302, which has become actuated, about the pivots 308 and 310, toward the left at the same time that the armature 302 or 304, respectively, was actuated toward the right. The upper armature 302 will thus engage the lug 300 when the lower armature 304 has been pulled to the electromagnetic coil 316, and the lower armature 304 will engage the lug 300 when the upper armature 302 has been pulled to the electromagnetic coil 318.

Immediately upon the disengagement of the lug 300 from the lower armature 304, in response to the actuation of the latter toward the right, as viewed in Fig. 8, the spring 177 will wind itself tightly about the constantly rotating drum 173, effecting the before-described clutching of the cam 105 to the shaft 170. The cam 105 will then rotate with the shaft 170 for a half-revolution. More than a half-revolution of the cam 105 is prevented by the lug 300 on the collar 183, during its rotation in its circular path about the axis of rotation of the drum 173, coming into engagement with the upper armature 302. The rotation of the collar 183 will thus become interrupted, and the end 191 of the spring 177 will be held back from further rotation. This will effect a partial unwinding of the springs 177 from its frictional engagement with the drum 173, so as to render it loose again upon the drum 173. The drum 173 will continue to rotate with the shaft 170, but the barrel 345 and the cam 105 secured thereto will have become unclutched therefrom. The cam 105 will thus become stopped in its upper position, with the table 12 raised to its upper effective position, in which the papers 2 can not be fed out of the hopper 339.

When the lug 300 becomes disengaged from the upper armature 302, similarly, the cam 105 will become rotated with the shaft 170 through another half-revolution, until the lug 300 of the collar 183 reengages the lower armature 304. As the armatures 302 and 304 are positioned 180 degrees away from each other in the path of rotation of the lug 300 of the collar 183, the cam 105 will, this time, be stopped in its lower position, to permit lowering of the table 12 by gravity to its ineffective position.

To control the degree of unwinding of the spring 177, so that the cam 105 shall stop, each time, at the same point of its lower or upper position, respectively, the portion of the lug 300 on the left-hand side of the disc 183, as viewed in Fig. 8, is caused to engage always the same end wall of a slot 185, that is cut in a flange 169 of the cylindrical barrel 345.

The armatures 302 and 304 thus operate in alternation, to interrupt the rotation of the cam 105 at the end of each half-revolution thereof. In response to the successive closings of the circuits of the upper and the lower electromagnetic coils 318 and 316, therefore, the cam 105 becomes rotated through successive half-revolutions to effect intermittent actuation of the table 12, up and down, into its two effective and ineffective positions.

The half-revolution of the cam 105 that effects the lowering of the table 12 is brought about through the closing of a contact member 574 (Figs. 14 to 16 and 32), to close the circuit of the upper electromagnetic table-lowering coil 318. The half-revolution of the cam 105 that effects the raising of the table 12 is brought about through the closing of the circuit of the lower electromagnetic table-raising coil 316.

Similar spring-controlled clutches are under the control of other similar electromagnetic coils. A shaft 48 is provided with a continuously rotating pulley 136 (Figs. 2 and 3); shafts 77 and 84 are provided with continuously rotating sprocket gear wheels 132 and 257, respectively (Figs. 2 to 5); and a shaft 321 is provided with a continuously rotating sprocket gear wheel 335 (Figs. 2, 3 and 30). These shafts, journaled in one or both side frames 165 and 167, are driven intermittently from their respective continuously rotating pulleys and gears similarly to the manner in which the cam 105 on the shaft 170 is intermittently rotated by the pulley 56. The shafts 48 and 77, for example, are each provided with two coils 316 and 318, the same as the shaft 170, to effect their intermittent actuation, through half revolutions, in the same way as before described, through the medium of intermittently actuated drums 173.

The shafts 321 and 84, however, are actuated intermittently through complete revolutions, instead of through only half-revolutions. The two sets of electromagnetic coils 316 and 318 are, therefore, replaced, in the case of the shafts 321 and 84, by only a single coil 332 provided with but a single armature 334 (Figs. 9 to 11). The mechanism for driving the intermittently rotating shaft 321 will now be described; the shaft 48 is actuated in similar fashion.

The constantly rotating sprocket wheel 335 is mounted upon a drum 173 that is loosely mounted upon the shaft 321. A spring 347, mounted about the drum 173, corresponds to the spring 177. As illustrated in Figs. 10 and 11, the armature 334 normally engages a lug 336 on the periphery of a floating ring 340, which corresponds to the lug 300 of the collar or disc 183 of Fig. 8. A slot 342, corresponding to the slot 185, is provided in one end of a cylindrical case 344, corresponding to the barrel 345. The case 344 is fixed to the shaft 321, as by means of a nut 35.

Upon the closing of the circuit of the coil 332, the armature 334 will become attracted to the core 337 of the coil 332, in opposition to the action of a flat spring 339, thereby becoming released from its engagement with the lug 336. The spring 347 will thereupon wind itself about the drum 173 to clutch the shaft 321 thereto. Immediately thereafter, the spring 339 will return the armature 334 to its normal position into the path of travel of the rotating lug 336 of the floating ring 340. The armature 334 will thereupon become reengaged by the lug 336, therefore, to unclutch the shaft 321 after a complete revolution thereof. In other respects, the operation is substantially the same as described above in connection with the electromagnetic coils 316 and 318 and their armatures 302 and 304.

As more fully explained hereinafter, the shaft 48 controls the raising and lowering of the guide members 55, the shaft 84 effects half-revolutions of the table 91 between the feeding of successive groups of papers to the stack 89, the shaft 77 effects the lowering of the table 91, resulting in removal of the completed stack 89 therefrom, and the shaft 321 controls the positioning of successive address plates 205 for controlling the number of papers in the successive stacks 89. The address plates 205 are initially stacked in a vertically-disposed container, magazine or receptacle 276, each address plate corresponding to a different newsdealer to whom the newspapers stacked on the tble 91 are to be shipped. Each plate 205 is provided at one of its ends with a cut-out 500, and the plates are so positioned in the receptacle 276 that a vertically disposed slide 501 in the magazine 276 is received in the cut-outs 500. This insures that no plate shall be placed in the magazine in the reversed position. A slide 232 is positioned in horizontally disposed guide grooves or ways 309 under the container 276, with the lowermost plate 205 in the container 276 normally resting thereon. The slide 232 is, at the proper time, moved to the right, as viewed in Fig. 1, from beneath the container 276, so as to permit the lowermost plate 205 in the container to drop into a position from which the slide 232 may actuate it toward the left, as described in the said applications. The slide 232 will thus move the lowermost plate 205 from under the magazine 276 to a definite position underneath a plate 313. The plate 205 previously under the plate 313 is, at the same time, moved into a container 275, over a spring-pressed finger 317. The plates 205 are later removed from the container 275 for new use.

When the plate 205 is positioned under the plate 313, the manually adjusted lugs 201 will respectively become positioned under pairs of contact members 206 and 207 predetermined by the adjustment of the lugs 201 on the address plate. The plate 205 will remain in this position during the counting off of the papers in the particular stack 89 corresponding to this plate 205. Above the plate 313, a member 429 carries wiring 314 through a cover plate 315.

The slide 232 is provided with an anti-friction roll 305 that may be engaged between the tines of a forked arm 303. The arm 303 is rocked about the axis of a pivotal shaft 301 by means of links 30 and 244. The relative positions of these elements is illustrated by the plan view of Fig. 3, and by the diagrammatic perspective of Fig. 32. At each revolution of the shaft 321, it will actuate a crank 328 to rock, through the links 30 and 244, the shaft 301 and the forked arm 303. During this rocking of the arm 303, it will positively move the slide 232 away from under the container 276 first, to the right, as viewed in Fig. 1, and then to the left. As explained in the said applications, the forked arm 303 may be spring-loaded, to prevent possible destruction of the plates 205 or parts of the machine, in the event that there should be an obstruction to the smooth passage of the plates during the actuation of the slide 232; and an adjustable stop or stops may also be employed to limit the return movement of the slide 232.

As before stated, it is desired to count the sheets in the stack 89 up to a predetermined number, which number is different for each individual newsdealer. The predetermination of the count is effected by means of suitable manually adjustable lugs 201 on the address plates 205. The positions to which the lugs 201 are adjusted on the address plates 205 determine the number of papers 2 that shall be accumulated in a particular stack 89 on the table 91, for a particular dealer.

There are two lugs 201 on each address plate 205 (Figs. 22 and 23), manually adjustable to any of a plurality of positions along respective scales 409 and 411 at the sides of the address plate 205. The divisions of the scale 411 correspond to units of 25, and the divisions of the scale 409 correspond to individual counts. If a greater count is needed, as will be obvious, it is possible to increase the number of scales 409 and 411.

These lugs 201 are so arranged on the plate 205 that, when the plate 205 is moved into position under the plate 313, they will be disposed under two respective rows of contact members 206, 207; one of the lugs 201 will close a desired pair of contact members 206 and the other lug 201 a pair of desired contact members 207. Which two pairs of contact members 206 or 207 shall be closed by the respective lugs 201 depends on the position to which the lugs 201 have been normally adjusted on the address plate.

The positions of the lugs 201 on the address plate 205 determine, therefore, which of the contact members 215 and 219, when engaged by the respective arms 213 and 217, shall effect a closing of the circuit of the lower table-raising electromagnetic coil 316, which stops the feed of the papers out of the hopper 339. The lugs 201 are maintained in adjusted position on the plates 205 by means of projections 209 on the bottoms of the lugs 201 extending into openings 195 in the plates 205.

The electric system is normally ineffective to energize the table-raising coil 316, even though the selected pairs of contact members 206 and 207 are thus continuously connected into circuit, in series with a direct-current source of energy, such as a rectifier-and-filter 379, and notwithstanding the engagement of the contact arms 213 and 217 with selected contact members 215 and 219. The circuits for effecting the desired operations remain open until suitably manually adjusted lugs 201 effect the closing of desired pairs of contact members 206 and 207; and then only after operating the machine through a cycle or a group of cycles of operation. The necessary circuits will be rendered effective, in sequence, at the end of predetermined rotative movement of the counting wheel 323, as determined by the counting finger 13, and as controlled by suitable contact members 215 and 219 when engaged by the respective contact arms 213 and 217.

One of the circuits of the coil 316, as may be traced in Figs. 28 and 32, extends from the rectifier-and-filter 379 to the ground 614; and from a ground 66, through the coil 316, the switch 533, and the lower contact members 207 marked 0, 25, 50, . . . to the pair of contact members 207 that are closed by one of the lugs 201; thence, by way of one of the conductors, some of which are indicated at 421, 423, 425 and 427, to the corresponding contact member 219. When this contact member 219 is engaged by the contact arm 217, the circuit continues, by way of a conductor 433, to the contact arm 213 and the contact member 215 that happens to be in engagement therewith; thence, by way of one of the conductors, some of which are indicated at 413, 415, 417, 38 and 419, to that pair of contact members 206 that are closed by the other lug 201; and thence, by way of the conductor 26, back to the other side of the rectifier-and-filter 379. The closing of this circuit by the said pairs of contact members 206 and 207, closed by the lugs 201, and by the said contact members 215 and 219, at the end of a predetermined count of the counter 323, will effect the energization of the coil 316, thus rendering the circuit effective to actuate the cam 105, as before described, to raise the table 12, thus to stop the feed of the papers 2 by the conveyor 9 out of the hopper 339, below the shield 11. The arms 213 and 217 can not, by themselves, effect this result; they can do this at a predetermined point of their rotation, when they respectively engage the proper contact members 215 and 219, only in cooperation with those pairs of contact members 206 and 207, connected into circuit therewith, that have previously been closed by the lugs 201.

The selector contact arms 213 and 217 and related parts are then reset to the initial positions as a new plate 205 is moved into place. The shaft 321, as illustrated more particularly in Figs. 2 and 30, drives, through the medium of a chain 338, the shaft 223 of the selector that shifts the address plates 205. Pinned or otherwise fixed to the shaft 223 are gears 227, cut away at 415, as shown more particularly in Figs. 19 and 20. Two similar but smaller gears 229, on the said shafts 211 and 407, are also cut away. If similar but smaller gears 229, on the said shafts 211 and 407, are also cut away, the arms 213 and 217 do not occupy their initial positions, the rotation of the gears 227 will bring them into mesh with the gears 229, and rotate them, against the friction of the clutches 235, until the cut-away sections are brought into the position shown in Figs. 19 and 20, when the gears 227 and 229 will no longer mesh, and the arms 213 and 217 will then have been brought to the starting positions. The shaft 223 and the gears 227 will continue turning until returned to the positions shown in Figs. 19 and 20. In this position, the gears 229 cannot mesh with the gears 227 when the counting begins. This also returns the intermittent gears 259 to its initial position, so that it shall not turn the arm 217 until the 25th paper has been counted off. The parts are thus returned to their initial positions by a single rotation of the shaft 223.

At the completion of the count, as described in the said applications, a wrapper or label, with the address thereon, may be fed to the stack, or to some other suitable place. The wrapper-feeding mechanism, not being claimed herein, is omitted from the present disclosure.

If the papers 2 have been fed on to the table 91, as above described, they will become stacked thereon with their said folded edges 7 leading. It is desirable so to stack the papers 2 in the stack 89, however, that each group of twenty-five, or any other desired number, of papers shall have the folded edges 7 reversed; that is, for example, so that the lowermost twenty-five papers in the stack 89 shall have their end and side folded edges facing north and east, respectively, the next twenty-five papers shall have those edges facing south and west, respectively, the next twenty-five north and east again, etc. Alternating the papers in this manner is desirable for some purposes, such as to facilitate their being counted by the persons receiving them, and also to make a more stable stack, with the upper papers thereof more or less level.

This result may readily be effected by turning the table 91 through 180 degrees upon the completion of the feeding and stacking of every group of twenty-five or any other desired number of papers 2. Any desired number of groups of ten, twenty-five, fifty, etc., papers may thus be stacked on the table 91, with semi-rotations of the table 91 between the stacking of the successive groups.

It is during these semi-rotations of the table 91 that the table 12 is raised to prevent further feeding of the papers 2 out of the hopper 339 by the conveyor 9. Before each semi-rotation of the table 91, the guide members 55 are raised, from their normal effective positions, up to ineffective positions, above the stack of papers 89; and after each semi-rotation of the table 91, the guide members 55 are relowered to their normal effective positions.

The table 91 is turned by rotating a vertically disposed shaft 95 upon which it is mounted. Half-rotations of the shaft 95 are effected, in timed relation to the operations above described, by means of a horizontally disposed rack bar 431, that meshes with a gear 432 secured to the shaft 95. The rack bar 431 is slidably actuated horizontally, first to the right, and then to the left, as viewed in Figs. 1 and 5, in guides 608. The slidable actuation of the rack bar 431 is effected by means of a crank 429 that is connected to the rack bar 431 by a link 430. The crank 429 is secured to a shaft 428, provided with a gear 4 that is driven by a gear 86 on the shaft 84 (Figs. 3 to 5 and 25). The connections are so designed that, corresponding to a half-revolution of the shaft 428, the shaft 95 shall be turned through a half-revolution; and when the shaft 428 is turned a further half-revolution, to its original position, the shaft 95 shall likewise be turned a further half-revolution to its original position. These half-revolutions are effected at the end of the feeding of the papers 2 in groups of twenty-five, or any other desired number. The driving connections will be described hereinafter.

To effect the raising and lowering of the guide members 55, they are rendered pivotally movable upward, in substantially vertical planes, about a pivot 451, in opposition to the action of the spring 419. This may be effected in any desired manner, as by moving a vertically disposed link 443 toward the right, as viewed in Fig. 1, into engagement with a pin 441 mounted upon an arm 435 that is fixed to the arm 41. The link 443 is maintained always parallel to itself by a link 449 and a bell-crank lever 444 to both of which it is pivoted. The bell-crank lever 444 is actuated by means of a link 445 from a crank pin 447 on the shaft 48.

In the course of one complete revolution of the shaft 48, after the table 12 has been raised to stop the feed out of the hopper 339, the link 443 is actuated upward and to the right, as viewed in Fig. 1. This results in swinging the guide members 55 upward, about the pivot 451, away from the stack 89, into their ineffective positions, illustrated in Fig. 6. The pin 441 is covered with friction material, such as rubber or leather, the frictional binding of which against the link 443 prevents the elevator assembly from dropping while the guide members 55 are raised above the topmost paper in the stack 89.

An extension 53 prevents the guide members 55 from dropping below a certain level when the connecting rod 443 has been dropped to one side, and prevents frictional contact between the friction lug 441 and the connecting rod 443 at such times as the guide assembly should be free to move vertically.

During the time that the guide members 55 are raised, the table 91 and the stack 89 thereon are turned a half-revolution (in Fig. 6, the position of the table 91 is illustrated at the moment when a quarter-revolution has been effected), after which the shaft 48 is rotated through another half-revolution, to return the link 443 from the position of Fig. 6 to the position of Fig. 1, thus restoring the guide members 55 to their normal effective positions. The table 12 is then relowered, to permit resuming the feed of the papers out of the hopper 339 by the conveyor 9. Upon the feed becoming resumed, the papers will, this time, however, become stacked on the stack 89 in reversed position, with the said forward folded edges 7 of the papers 2 disposed on the stack 89 oppositely to the forward edges 7 of the prior-fed papers.

At the end of the counting of the predetermined number of papers desired to be attacked for any particular dealer, and their accumulation in the stack 89, the stack 89 is removed from the table 91. To this end, the table 91 is shown constituted of a frame comprising parallel horizontally disposed slats 52, alternating in position with the positions of similarly disposed elongated rolls 523 mounted on shafts 44. The rolls 523 are continuously rotated from a continuously driven shaft 33 by belts 426 engaging over pulleys 425 on the shaft 33 and pulleys 424 on the shafts 44 of the rolls 523. The mechanism for driving the shaft 33 will be hereinafter described.

The table 91 is raised and lowered by effecting successive half-revolutions of a cam 99 on a shaft 77 in response to actuation of the clutch controlled by one of the electromagnetic coils 332. The cam 99 is actuated through successive half-revolutions in response to half-revolutions of the shaft 77. A cam follower 427 disposed at the lower end of the table shaft 95 follows the cam 99 downward in engagement therewith, carrying the table 91 with it. A further half-revolution of the shaft 77 results in restoring the cam 99, and, therefore, the table 91, to their normal positions. The face of the gear 432 is wide enough so as to remain in mesh with the rack 431 both when the table 91 is in its uppermost and its lowermost positions.

To effect removal of the stack of sheets, the table 91 is lowered below the continuously rotating rolls 523, with its slats 52 into the spaces between these rolls. The lowering of the table 91 effects the lowering of the stack 89 of papers 2 into contact with the rolls 523. The stack 89 becomes thereupon moved by the rolls 523 off the table 91 and on to a table (not shown) at the side of the machine, either in front of or behind the papers, as viewed in Fig. 1.

One of the bars 186 of the table 12, that becomes periodically raised to stop the feed of the papers out of the hopper 339, is provided with a projection 350, that is adapted to engage a plunger 352, to raise it, as illustrated more particularly in Figs. 2, 12 to 16, 18 and 32. The plunger 352 depends through an opening 351 (Figs. 15 and 16) in the lower wall 355 of a commutator or control box 353 (Fig. 2), and is secured to the underside of two insulating, contact-engaging members 357 and 359, that are secured together at different levels. The contact-engaging member 357 engages under a contact member 356 and the contact-engaging member 359 engages under a contact member 362. The contact members 356 and 362 are disposed at correspondingly different levels, as illustrated in Figs. 12 to 16 and 18. The raising of the plunger 352 by the projection 350, therefore, will effect the raising of the two contact members 356 and 362. When the table 12 ocupies its lower position, a contact member 358 is out of contact with the contact member 356 and a contact member 360 engages the contact member 362. The raising of the plunger 352 by the projection 350, therefore, will result in the opening of the contact members 360 and 362, and the closing of the contact members 356 and 358. The opening of the contact members 360 and 362, as hereinafter explained, effects the breaking of the circuit of the table-raising coil 316, previously closed to effect the raising of the table 12. The closing of the contact members 356 and 358, as also hereinafter explained, effects the closing of the circuit of a commutator-drive motor 364 on the shaft of which are connected multiple-switch master-control switch arms 578 and 579 that are insulated from each other by an insulating collar 320. The electrical connections are shown diagrammatically in Fig. 32. Suitable speed reducers keep down the speed of the shaft of the motor 364 to a desired low speed. As soon as the table 12 becomes raised, therefore, at the end of each cycle of operation, by the closing of the contact members 356 and 358, the motor 364 is operated throughout a complete revolution to control the rotation of the master-control switches 578 and 579. As will hereinafter appear, only one of the two master switches 578 and 579 is effective at any one time, during any particular revolution of the motor 364.

The master switches 578 and 579 are shown in Figs. 16 and 31 respectively connected to contact brushes 54 and 56. These are omitted from the diagrammatic showing of Fig. 32.

The operations of the machine are synchronized by the master switches 578 and 579, in the course of one complete revolution thereof, by the motor 364. In the course of this complete revolution, the master switch 578 is caused to engage successively contact members 568, 570, 572 and 574, and the master switch 579, contact members 568, 370, 372, 374, 572 and 574. These contact members are set into an insulating disc 149.

When the master switches 578 and 579 engage the contact member 568 (Figs. 15 and 32), the guide members 55 become raised. When the master switch 578 engages the contact member 570, the table 91 is turned through a half-revolution. The guide members 58 are relowered to their normal position when the master switches 578 and 579 engage the contact member 572. And the cam 105 is restored to its original, lowered, position, to permit the table 12 to become relowered from its effective to its ineffective position, when the master switches 578 and 579 engage the contact member 574, whereupon the feeding of the papers 2 out of the hopper 339 recommences. Thereupon, the motor 364 is stopper by the breaking of its circuit through separation of the contact members 356 and 358, and the machine is ready for another cycle of operations.

The electric-circuit connections for effecting these operations are illustrated in Fig. 32. The contact member 568 is connected by a conductor 571 to the coil 318 for effecting the actuation of the shaft 48 through a half-revolution to effect the raising of the guide members 55. The contact member 572 is connected, by conductors 573 and 72, to the coil 316 for effecting the actuation of the same shaft 48 through another half-revolution to effect the lowering of the guide members 55. The contact member 570 is similarly connected, by a conductor 575, to the coil 332 for actuating the shaft 84 to turn the table 91 through half-revolutions. The contact member 574 is connected, by a conductor 576, to the electromagnetic coil 318 for lowering of the table 12 to restart the feeding of the papers 2 out of the hopper 339.

The lowering and raising of the table 91, and correlated raising and lowering of the guide members 55, are controlled by the master switch 579. When the master switch 579 engages the contact member 568, it effects the raising of the guide members 55, as before described. When it engages with the contact member 370, which is connected, by a conductor 73, to the upper coil 318 that controls a half-revolution of the shaft 77, it effects the lowering of the table 91. In these two positions, therefore, the master switch 579 effects successively the raising of the guide members 55, and the lowering of the table 91 to remove the stack 89 of papers thereupon. When the master switch 579 is actuated into engagement with the contact member 372, the arm 303 introduces a new address plate 205 from the receptacle 276 under the plate 313; at the same time, moving the previously used address plate 205 from under the plate 313 into the receptacle 275. The machine is thus made ready for the accumulation of a new stack 89 of papers for another newsdealer. When the master switch 579 engages the contact member 374, which is connected, by a conductor 104, to the lower coil 316 for controlling the shaft 77, it effects a restoration of the table 91 to its raised position. When it engages the contact member 572, it effects relowering of the guide members 55, as before explained.

The engagement between the master switches 578 and 579 and the respective contact members engaged thereby, need be but momentary. As soon as the master switches 578 and 579 move out of engagement with contact members 568 and 572, respectively, for example, the guide-controlling coils 318 and 316 controlled thereby become deenergized, and the corresponding armatures 302 and 304 are actuated out of the path of the lug 300.

Upon the lowering of the table 12, the circuit of the commutator motor 364 becomes opened at the contact members 356 and 358, whereupon the motor 364 stops running, but not until after a predetermined time interval. During that interval, the motor 364 has sufficient momentum to carry the master switches 578 and 579 out of engagement with the contact member 574, to their normal ineffective positions, between the contact members 574 and 568, before coming to rest.

A motor 65 for driving the machine may be connected to power-supply mains 436 and 438 of an alternating-current source 430 by means of the line switch 293 (Figs. 28 and 32). A pulley 15 on the shaft of the motor 65 drives pulleys 251, 252 and 123 by means of belts 112 and 114 and 122, respectively. The pulley 251 is mounted upon, so as to drive, the shaft 1 of the pulleys. The pulley 252 is mounted upon, so as to drive, the shaft 253 of the pulleys 32. The belts 3 and 9 are thus driven by the constantly rotating pulleys 74 and 32, respectively, through the medium of the constantly driven pulleys 251 and 252. The pulley 123 is mounted upon, so as to drive, the shaft 33. Power is thus continuously supplied to the shaft 33 for continuously driving the rolls 523. A sprocket chain 87 is mounted over a sprocket wheel 14 (Fig. 3) on the shaft 1 and the sprocket wheel 335 on the shaft 528 to drive the latter.

On the shaft 33 there is mounted also a pulley 113 over which passes a belt 115, that drives a pulley 116 on the shaft 254 of the pulley 59 and, therefore, supplies power for the belts 21. It supplies power also for the belts 17 through the medium of a gear 118 mounted upon the shaft 255 of the pulley 57, and meshing with a gear 119 on the shaft 254 of the pulley 59.

A belt 135 is mounted over a pulley 8 on the shaft 253 and over the pulley 56 on the shaft 170, and a belt 134 is mounted over a pulley 10 on the shaft 170 and over the pulley 136 on the shaft 48. The shafts 170 and 48 are thus continuously driven to actuate the cams 105 and the guides 55, respectively, when they become clutched to these respective shafts. A sprocket gear 126 on the shaft 33 drives a sprocket chain 130 for actuating the sprocket gear 132 on the shaft 77 and the sprocket gear 257 on the shaft 84.

The shaft 223 for resetting the selector arms 213 and 217 to their initial positions has been described above as driven by the sprocket chain 338 from the shaft 321 that controls the address slide 232.

The power-supply mains 436 and 438 are also connected by the line switch 293 to the rectifier-and-filter 379 (Figs. 28 and 32). The circuit to the rectifier-and-filter 379 extends, on one side, from the generator 430, through a safety fuse 292 and the line switch 293, and by way of the conductor 438; and, on the other side, from the generator 430, through the switch 293, by way of the conductor 436. One side of the rectifier-and-filter 379 is connected to the ground 614, and the other side to the conductor 26. All the other grounds are connected to the ground 614. The ground 614 constitutes one side, and the conductor 26 the other side, of a source 379 of rectified-and-filtered non-pulsating direct current for energizing the circuits of the electromagnetic coils.

It will be assumed that the machine is at rest. The master-control switches 578 and 579 occupy their normal illustrated positions, between the contact members 574 and 568. The table 12 has previously, at the end of the immediately prior cycle of operations, been raised by the cam 105 on the shaft 170 to its effective position, above the conveyor 9, closing up the space under the projecting finger 16 of the wall, and raising the papers in the hopper 339 above the conveyor 9, so that the machine can not feed any papers 2 out of the hopper 339.

The bars 186 of the table 12 are raised, at this time, effecting engagement of the contact members 356 and 358, and disengagement of the contact members 360 and 362. The arms 213 and 217 occupy their normal, illustrated positions.

The closing of the line switch 293 will connect the motor 65 and the rectifier-and-filter 379 to the power-supply mains 436 and 438. The motor 65 will set the belt conveyors 3 and 9 into operation through the medium of the belts 112 and 114. The conveyor 3 will effect the feeding into the hopper 339 of as many papers 2 as can pass under the wall 5, but the raised table 12 prevents feeding of the papers by the belts 9 out of the hopper 339. The pulleys and sprocket gears 56, 136, 132 and 257 for actuating the respective shafts 170, 48, 77 and 84 are set into continuous rotation by their belts and sprocket chains 114, 135, 134, 122, 126 and 130, to drive continuously the drums 173 and other corresponding mechanisms of the shafts 170, 48, 77 and 84. The clutches are not, at this time, however, effective. The cam 105 of the shaft 170 remains raised, therefore, to hold the table 12 in its raised, effective position, the guide members 55 similarly occupy their lowered positions and the table 91 is stationary.

The contact members 356 and 358 being closed when the table 12 is raised, a circuit is established, upon the closing of the line switch 293, to effect the lowering of the table 12. This circuit may be traced in Fig. 32 from the main 436, by way of a conductor 440, through the contact members 356 and 358 and, by way of a conductor 29, to the motor 364. The circuit continues from the motor 364, by way of a conductor 442, to the main 438. The motor 364 will thereupon be set into operation to actuate the master switches 578 and 579 through a complete revolution.

The circuit of the master switch 579 is, at this time, open at the first or 0 pair of contact members 207, that are connected by the conductor 421 to the 0 contact member 219. The circuit of the master switch 578 may be traced, however, from the rectifier-and-filter 379, by way of the conductor 26 and a conductor 20, to a contact member 19 (Figs. 19, 20, 28 and 32). The contact member 19 and a contact member 67 are bridged, in the initial position of the contact arm 213, by a bridging contact plate 18 that is insulatingly carried by the contact arm 213. The circuit continues from the contact member 67, by way of conductors 25 and 630, to the master switch 578.

As the master switch 578 is carried by the motor 364 successively into engagement with the contact members 568, 570 and 572, the guide members 55 will become raised, the table 91 will become turned through a half-revolution, and the guide members 55 will become lowered again, in successive order, through the medium of circuits hereinafter described; but these operations are of no consequence at this time. When the master switch 578 engages the contact member 574, however, the above-described circuit to the master switch 578 will continue through the contact member 574 and, by way of a conductor 576, to and through the upper table-lowering coil 318; and from the coil 318 to a ground 580.

The closing of this circuit of the upper coil 318 will cause it to become energized to actuate the upper armature 302 toward the right, and the lower armature 304 toward the left, as viewed in Fig. 8. The lug 300 on the collar 183 will thus become freed from its engagement with the upper armature 302. The spring 177 will, therefore, clutch the barrel 345 and the cam 105 integral therewith to the constantly rotating drum 173 and the shaft 170 to which it is secured. The cam 105 will thus become actuated, from its upper position, through an initial half-revolution only, as before described, until the lug 300 engages the lower armature 302. This lowering of the cam 105 permits lowering of the table 12 to its ineffective position, about its pivot 125, by gravity, thereby lowering the papers 2 in the hopper 339 into engagement with the continuously traveling belts 9.

The resultant lowering of the bars 186 with the table 12 effects opening of the contact members 356 and 358 and closing of the contact members 360 and 362, into the positions illustrated in Fig. 32. The breaking of the engagement of the contact members 356 and 358 effects the opening of the above-described circuit of the motor 364. The master switches 578 and 579 will, therefore, become restored to their normal positions, illustrated in Fig. 32, between the contact members 574 and 568. The closing of the contact members 360 and 362 effects the partial closing of a circuit to the lower table-raising coil 316, as hereinafter described.

Upon the table 12 becoming thus lowered, the belts 9 begin to feed the papers 2 out of the hopper 339, through the gap between them and the finger 16 of the wall 11, and under the counting finger 13. As the papers 2 pass successively under this counting finger 13, they successively actuate it, to effect the closing of the contact members 164 and 166. The circuit of the counter electromagnetic coil 202 may be traced from the rectifier-and-filter 379, by way of the conductors 26 and 204, through the contact members 164 and 166 and, by way of the conductor 200, to the counter electromagnetic coil 202; and from the coil 202, to a ground 68. The successive closing and opening of this circuit of the coil 202 by the counting finger 13, as before explained, results in step-by-step rotatable actuation of the counting wheel 323, the counter shaft 211 to which it is secured, and the contact arm 213 of the selector.

At the end of twenty-five such step-by-step actuations of the counting shaft 211, the arm 213 will have become actuated thereby, step by step, throughout a complete revolution. A group of twenty-five papers, corresponding to the twenty-five contact members 215, will, therefore, have become counted and accumulated in the stack 89 upon the table 91. Before any more papers 2 will be stacked on the table 91, the circuit of the electromagnetic coil 316 will become closed, to effect actuation of the cam 105 through a further half-revolution, to raise it, in order that it may raise the table 12, thereby to close the gap between the finger 16 of the wall 11 and the belts 9, thus to stop the feed of the papers 2 out of the hopper 339. The circuit of the said coil 316 may be traced by way of the conductors 26 and 20, through the contact members 19 and 67 and the contact member 18 bridged thereby, by way of the conductor 25 and a conductor 64, through the contact members 360 and 362, and by way of a conductor 46, to and through the coil 316; and from the coil 316 to the ground 66.

The coil 316 becomes thereupon energized to actuate the lower armature 304 to the right, as viewed in Fig. 8, thereby releasing the lug 300 from engagement therewith. The spring 177 thereupon binds against the constantly rotating drum 173, to clutch the cam 105 thereto, thereby to effect a further half-revolution only of the cam 105, as before described. This half-revolution of the cam 105 results in raising the table 12, thus closing the gap under the finger 16 and stopping the feed of the papers out of the hopper 339. The bars 186 become raised at the same time, effecting the breaking of the engagement of the contact members 360 and 362, and the reengagement of the contact members 356 and 358. The breaking of the engagement of the contact members 360 and 362 effects the opening of the above-described circuit of the table-raising coil 316.

Immediately after the feed has been stopped by the lifting of the table 12, following upon the stacking on the table 91 of the first group of twenty-five papers 2, the guide members 55 will become raised, the table 91 will then be turned a half-revolution, and the guide members 55 will then be relowered, after which the table 12 will become relowered, to permit the stacking on the table 91 of twenty-five more papers, making fifty papers in all. This is effected by means of the master switch 578, which, as before stated, is rotated, with the master switch 579, through a complete revolution, by the motor 364, upon the closing of the contact members 356 and 358, simultaneously with the raising of the table 12. The circuit of the master switch 579 remains open, however, as before.

During this revolution of the master switch 578, it will first engage the contact member 568. A circuit will thereupon become established by way of the conductors 26 and 20, through the contact members 19 and 67, which have become bridged by the contact member 67 upon the arm 213 returning to its original position, upon the feeding and stacking of the first twenty-five papers 2 and, by way of conductors 25 and 630, to the master switch 578. The circuit continues from the master switch 578, through the contact member 568 and, by way of the conductor 571, to the electromagnetic coil 318 for actuating the shaft 48; and from this electromagnetic coil 318, to a ground 42. The consequent energization of this electromagnetic coil 318 effects the actuation of the armature 302, shown in Fig. 8. The spring 177 thereupon binds tightly against the drum 173, thereby to effect the clutching of the shaft 48 to the constantly rotating pulley 136. The shaft 48 becomes thereby rotated through a half-revolution, or until the lug 300 engages the armature 304, which has become actuated to the left simultaneously with the actuation of the armature 302 to the right, as viewed in Fig. 8. During this half-revolution, the shaft 48 will rotate the crank pin 447 through a half-revolution, to effect actuation of the link 443 through the links 445, 444 and 449. The guide members 55 thus become raised pivotally above the top of the stack 89, about the pivot 451, to the position shown in Fig. 6.

When the master switch 578 becomes actuated into engagement with the contact member 570, a circuit becomes established from the master switch 578, through this contact member 570, by way of the conductor 575, to the electromagnetic coil 332 for actuating the shaft 84; and from this electromagnetic coil 332, to a ground 83. The circuit of this electromagnetic coil 332 becoming thus closed, the coil will become energized to effect rotation of the shaft 84 through a complete revolution, in the manner before described. During this complete revolution, the gear 86 will rotate the gear 4 through a half-revolution. The crank 429 that is actuated by the gear 4 will thus become actuated through a half-revolution, thereby effecting an actuation of the rack 431 to drive the gear 432 and the shaft 95 on which it is mounted through a half-revolution. This will result in turning of the table 91 and the stack 89 thereon through a half-revolution.

Meantime, the master switch 578 has been moved out of contact with the contact member 570, and into contact with the contact member 572. A circuit becomes then established from the master switch 578, through the contact member 572 and, by way of the conductor 573, to the lower coil 316 for controlling the shaft 48. Upon the closing of the circuit of this lower coil 316, the armature 304 becomes again attracted to the right, as viewed in Fig. 8, thereby again releasing the lug 300, and permitting a further half-revolution of the shaft 48, back to its original position, permitting the guide members 55 to become restored from the position illustrated in Fig. 6 to that illustrated in Figs. 1 and 2.

In its next position, the master switch 578 engages the contact member 574. A circuit becomes then established from the master switch 578, through the contact member 574 and, by way of the conductor 576, and to and through the coil 318 for controlling the cam 105, to the ground 580. The consequent energization of this coil 318 will effect a rotation of the shaft 170 through a further half-revolution, in the same manner as before described, to effect the lowering of the table 12 by the cam 105 to its ineffective position, permitting the recommencing of the feeding of the papers 2 out of the hopper 339; and, through the elements 350 and 352, the reopening of the contact members 356 and 358 and the reclosing of the contact members 360 and 362.

The table 91, with the stack 89 of twenty-five papers thereon, has now been rotated through a half-revolution, while the guide members 55 were raised, and the guide members 55 have been restored to their normal position, in engagement with the topmost paper of the stack 89. With the table 12 relowered, the machine now again commences to feed the papers 2 out of the hopper 339 and on to the stack 89, but in a position reverse to that of the original stack of the first twenty-five papers. The electromagnetic coil 202 will resume control, through the pawl 327, of the step-by-step actuation of the shaft 211.

The shaft 211 will then be actuated twenty-five further steps, corresponding to twenty-five additional counts, as controlled by twenty-five further operations of the pawl 327. During the feeding of this further group of twenty-five papers, the contact arm 213 becomes actuated into engagement with the successively positioned contact members 215, as before described. At the twenty-fifth additional count, or fifty counts in all, corresponding to the feeding and stacking of fifty papers, therefore, the contact arm 213 will again become returned into engagement with the contact member 215 marked 0. Thereupon, the before-described circuit of the lower coil 316 for actuating the shaft 170 will again become established through the contact members 19, 18 and 67. This coil 316 will thereupon effect a reclosing of the gap under the finger 16 of the wall 11, to prevent further feeding of the papers 2 out of the hopper 339, and the motor 364 will become reactuated throughout a complete revolution, to effect reengagement of the master switch 578 with the contact members 568, 570, 572 and 574. During this revolution of the master switch 578, the guide members 55 will again become raised, the table 91 will again become rotated through a half-revolution, the guide members 55 will again become relowered, and the upper coil 318 for controlling the cam 105 will again become energized, to effect resumption of feeding of the papers out of the hopper 339, in the same manner as before described.

The feeding of the papers 2, recommenced at the end of the stacking of the first twenty-five papers, has thus been continued to effect the stacking of a group of twenty-five additional papers on the stacking table 91, but turned 180 degrees with respect to the said first group of twenty-five papers. The stack 89 on the table 91 will now contain fifty papers, the lower group of twenty-five facing with their folded edges 7 in one direction, and the next group of twenty-five facing with their folded edges in the opposite direction. A further group of twenty-five papers may now be stacked, with their edges in the same direction as those of the original twenty-five stacked papers. Upon the accumulation of these additional twenty-five papers, making a total of seventy-five, the same operations will again take place, and so on up to 100 papers, 125, and up to any other number.

In this manner, under the control of the selector contact arm 213, and the contact members 67, 18 and 19, the cam 105 will become raised to lift the table 12, thereby to interrupt the feed of the papers out of the hopper 339, at the end of the feeding of groups of 25, 50, 75, 100, 125, and so on, papers. Under the control of the master switch 578, between the feeding of successive groups of the papers, the guide members 55 will be raised, the table 91 with the stack 89 thereon will be turned a half-revolution, the guide members 55 will be relowered, and the table 12 will be relowered to recommence the feeding and stacking of the papers.

During the stacking of the first twenty-five papers, while the contact arm 213 was actuated by the counting ratchet wheel 323 into engagement with the successive contact members 215, the contact arm 217 remained in engagement with the first contact member 219, marked 0. At the end of the count of twenty-five papers stacked on the table 91, however, upon the return of the contact arm 213 to its initial position, the contact arm 217 became actuated, in the manner before described, into engagement with the second contact member 219, marked 25. It remained in engagement with this second contact member 219, marked 25, throughout the count of the next twenty-five papers, at the end of which count it became actuated into engagement with the third contact member 219, marked 50; and so on.

Let it be assumed that the lugs 201 have been adjusted upon an address plate 205 so as to count and stack 62 papers, and that this address plate has been actuated into position under the plate 33 by the lever 303. One of the lugs 201 has, therefore, been positioned adjacent to the scale 409, so as to close the thirteenth pair of contact members 206, marked 12, and the other lug 201 has been positioned adjacent to the scale 411, so as to close the third pair of contact members 207, marked 50. That thirteenth pair of contact members 206, marked 12, is shown connected to the corresponding thirteenth contact member 215, marked 12, by the conductor 38 (Figs. 28 and 32); and the said third pair of contact members 207 is connected to the corresponding third contact member 219, marked 50, by the conductor 425 (Fig. 28).

At the end of the feeding and stacking of the 62nd paper in the stack 89, therefore, the contact arm 213 will have become actuated into contact with the said thirteenth contact member 215, marked 12; and the contact arm 217, as before stated, has previously been actuated into engagement with the third contact member 219, marked 50, at the end of the count of fifty papers. A circuit will thereupon become established from the rectifier-and-filter 379, by way of the conductors 26 and 22, through the thirteenth pair of contact members 206, marked 12, and by way of the conductor 38, to the corresponding thirteenth contact member 215 marked 12. The circuit continues through the contact arm 213, in engagement therewith, and by way of the conductor 433, to the third contact member 219, marked 50, which is engaged by the contact arm 217. From the contact arm 217, the circuit continues, by way of the conductor 425 (Fig. 28), to the third pair of contact members 207, marked 50; and then to a conductor 24, where the circuit branches. One branch proceeds, by way of a conductor 28, and through the switch 533, to the lower coil 316 for actuating the cam 105. This branch circuit continues, through the coil 316, to the ground 66. The first thing that results at the completion of the count of 62 papers, therefore, is to raise the table 12, to stop the feed. The contact members 356 and 358 become closed, and the contact members 360 and 362 opened, at the same time. The closing of the contact members 356 and 358 effects a reclosing of the circuit of the motor 364.

The second branch of the circuit leads from the conductor 24, by way of a conductor 60, to the master switch 579. This master switch 579, which has been disconnected from the rectifier-and-filter 379 during the operations before described, is now connected thereto; and the master switch 578, that has previously, in the circuits before described, been connected to the rectifier-and-filter 379, is now disconnected therefrom. Whereas the master switch 578 has previously been alone effective, therefore, to control the operation of the machine during the revolution of the motor 364, it is now the master switch 579 that alone has that power.

When the master switch 579 engages the contact member 568, it effects the raising of the guide members 55, in the same way as before described. When it engages the contact member 370, the circuit continues from the master switch 579, by way of the conductor 73, to the upper coil 318 for controlling the shaft 77; and through this coil 318, to a ground 40. The energization of this coil 318 will effect actuation, through a half-revolution, in the manner before described, of the shaft 77. The consequent half-revolution of the cam 99 will effect a lowering of the cam follower 427, together with the shaft 95 and the table 91 mounted thereon, but without disengaging the gear 432 from the rack 431. Upon the lowering of the table 91, the stack 89 of papers becomes lowered into engagement with the rolls 523, which effect removal of the stack 89 of papers, as before explained.

The next operation controlled by the master switch 579 is to advance the next address plate 205 under the plate 313. This plate 205 is provided with two lugs 201, suitably positioned to determine beforehand the correct number of newspapers that shall be stacked on the table 91 for the particular dealer corresponding to that particular address plate.

In its next position, therefore, the master switch 579 engages the contact member 372 which is connected, by way of a conductor 29, to the electromagnetic coil 332 for controlling the arm 303 and to a ground 50. The engagement of the master switch 579 with the contact member 372, therefore, effects the discharge of the address plate 205 out from under the plate 313, into the receptacle 275, and the insertion of the lowermost address plate 205 in the receptacle 276 under the plate 313, in preparation for the accumulation of a new stack 89 on the table 91.

When the master switch 579 engages the contact member 374, a circuit becomes established, by way of the conductor 104, to the lower coil 316 and a ground 51. This lower coil 316 will control the shaft 77 to effect a further half-revolution of the shaft 77, and the cam 99 thereon, to effect a re-raising of the table 91 to its original position. The interval between the lowering and raising of the table 91 is sufficient for the rolls 523 to perform their work of removing the stack 89 of papers.

Upon the master switch 579 reaching the contact member 572, the circuit of the coil 316 for controlling the shaft 48 becomes reestablished by way of the conductors 573 and 72, effecting the relowering of the guide members 55 to their original position. The contact arms 213 and 217 have also been returned to their initial positions, as before explained.

The machine will now proceed to accumulate a new stack 89 of papers on the table 91, the size of which is determined by the setting of two lugs 201 on the address plate newly advanced under the plate 313.

In the example given above, the stack 89 of sixty-two papers collected on the table 91, as determined by the lugs 201 on the previous address plate 205, was constituted of two groups of twenty-five papers each and one group of twelve papers, the table 91 having been turned through half-rotations during interruptions of the feed between each two successive groups. The number of papers in the last group may be varied or adjusted, as desired, from zero to twenty-four, depending upon the position of the lug 201 that is connected to the corresponding contact member 215. The actuation of the contact arm 213 from its initial position to a position corresponding to the said corresponding contact member 215 will determine, in all cases, the variable number of papers in the last group stacked.

By maintaining the switch 533 open, the above-described circuit of the electromagnetic coils 316 controlled thereby will be maintained continuously open. The papers may thus be caused to feed continuously through the machine, without the aid of the selector, until either the switch 533 is closed, to effect raising of the table 12, or until the hopper 339 becomes entirely emptied. This is an advantage when it is desired merely to count the papers to any number, at will.

Modifications will occur to persons skilled in the art, and all such are considered to fall within the spirit and scope of the invention, as defined in the appended claims.

What is claimed is:

1. Apparatus of the character described comprising a member on a predetermined portion of which sheets may be stacked, a stop above and to one side of the said predetermined portion, means for feeding the sheets on to the member from above the member and with the forward edges of the sheets against the stop to cause the sheets to become stacked on the member with the said forward edges alined by the stop, and means for raising the stop automatically in accordance with the height of the stack of sheets.

2. Apparatus of the character described comprising a member on a predetermined portion of which sheets may be stacked, a stop above and to one side of the said predetermined portion, feeding means positioned at the other side of and spaced from the predetermined portion for feeding the sheets to a point at the said other side and above the member, the feeding means being constructed to release the sheets and permit them to travel by inertia above the member against the stop to cause the sheets to become stacked on the member, and means for guiding the sheets toward the stop during their travel by inertia above the member.

3. Apparatus of the character described comprising a member on a predetermined portion of which sheets may be stacked, a stop above and to one side of the said predetermined portion, feeding means positioned at the other side of and spaced from the predetermined portion for feeding the sheets to a point at the said other side and above the member, the feeding means being constructed to release the sheets and permit them to travel by inertia above the member against the stop to cause the sheets to become stacked on the member, and a guide disposed between the said point and the stop at a downward incline for guiding the sheets at a downward incline toward the stop during their travel by inertia above the member.

4. Apparatus of the character described comprising a member on a predetermined portion of which sheets may be stacked, a stop above and to one side of the said predetermined portion, a guide member extending at a downward incline toward the stop and integral with the stop, and means for feeding the sheets under the guide and against the stop to cause the sheets to become stacked.

5. Apparatus of the character described comprising a member on a predetermined portion of which sheets may be stacked, a stop above and to one side of the said predetermined portion, a guide member extending at a downward incline toward the stop and integral with the stop, means for feeding the sheets under the guide member and against the stop to cause the sheets to become stacked, and means for raising the guide member, the stop and the feeding means automatically in accordance with the height of the stack.

6. Apparatus of the character described comprising a member on a predetermined portion of which sheets may be stacked, a stop above and to one side of the said predetermined portion, and a conveyor for feeding the sheets to a level above the topmost sheet of the stack and then against the stop to cause the sheets to become stacked, the conveyor being positioned at the other side of and spaced from the predetermined portion.

7. Apparatus of the character described comprising a member on a predetermined portion of which sheets may be stacked, a stop above and to one side of the said predetermined portion, a guide member extending at a downward incline toward the stop and integral with the stop, and a conveyor for feeding the sheets to a level above the topmost sheet of the stack and then under the guide member and against the stop to cause the sheets to become stacked.

8. Apparatus of the character described comprising a member on a predetermined portion of which sheets may be stacked, a stop above and to one side of the said predetermined portion, a conveyor for feeding the sheets to a level above the topmost sheet of the stack and then against the stop to cause the sheets to become stacked, and means for raising the upper portion of the conveyor and the stop automatically in accordance with the height of the stack of sheets.

9. Apparatus of the character described comprising a member on a predetermined portion of which sheets may be stacked, a stop above and to one side of the said predetermined portion, a guide member extending at a downward incline toward the stop and integral with the stop, a conveyor for feeding the sheets to a level above the topmost sheet of the stack and then under the guide member and against the stop to cause the sheets to become stacked, the upper portion of the conveyor being vertically adjustable, and means connecting the guide member with the upper portion of the conveyor, the guide member being in engagement with the uppermost sheet of the stack so as to become automatically raised, together with the stop and the upper portion of the conveyor, in accordance with the height of the stack of the sheets.

10. Apparatus of the character described comprising a member on which sheets may be stacked, a stop, a conveyor for feeding the sheets to a level above the member and on to the member and against the stop, the stop being automatically adjustable vertically in accordance with the height of the stack, and means connected with the stop for automatically raising the point of delivery of the sheets by the conveyor on to the first-named member in accordance with the height of the stack.

11. Apparatus of the character described comprising a member on which sheets may be stacked, a conveyor positioned entirely to one side of the member for feeding the sheets to a level above the member and on to the member, a member maintained by gravity in engagement with the topmost sheet of the stack and automatically raisable in opposition to the force of gravity as the height of the stack increases, the point of delivery of the sheets by the conveyor on to the first-named member being freely movable vertically, and means controlled by the second-named member to cause the said point of delivery to become raised in opposition to the force exerted by gravity in accordance with the height of the stack.

12. Apparatus of the character described comprising a member on which sheets may be stacked, a conveyor for feeding the sheets to the member, a stop for stopping the further travel of the sheets after they have been fed on to the member, and means for controlling the position of the point of delivery of the sheets by the conveyor on to the member and the position of the stop in accordance with the height of the stack.

13. Apparatus of the character described comprising a substantially vertically disposed conveyor for feeding sheet material in a substantially vertically disposed direction, and means for raising and lowering the discharge end of the conveyor without disturbing the position of the receiving end of the conveyor.

14. Apparatus of the character described comprising a substantially vertically disposed conveyor for feeding sheet material in a substantially vertically disposed direction, means for raising and lowering the discharge end of the conveyor without disturbing the position of the receiving end of the conveyor, and means for guiding the vertical movement of the discharge end of the conveyor.

15. Apparatus of the character described comprising substantially vertically disposed belts for feeding sheet material upward in a substantially vertically disposed direction, receiving-end and discharge-end pulleys over which the belts are disposed, and means for raising and lowering the discharge-end pulleys to raise and lower the point of delivery of the sheet material by the belts.

16. Apparatus of the character described comprising lower and upper pulleys, a belt disposed over the pulleys, the pulleys being freely adjustable with the belt disposed thereover, a third pulley, means connecting the third pulley with the upper pulley to cause the third pulley to become adjusted with the upper pulley, a fourth pulley and a fifth pulley above the other pulleys, a sixth pulley below the upper pulley and the third, fourth and fifth pulleys, a belt disposed over the upper pulley and the third, fourth, fifth and sixth pulleys, whereby the belts are adapted to feed sheet material between them and to deliver the sheet material between the upper pulley and the third pulley, and whereby the point of delivery of the sheet material between the upper pulley and the third pulley is adjustable.

17. Apparatus of the character described comprising a member on which sheets may be stacked, a member maintained by gravity in engagement with the uppermost sheet of the stack, and a conveyor for feeding the sheets on to the top of the stack and under the second-named member, the conveyor comprising lower and upper pulleys, a belt disposed over the pulleys, the pulleys being freely adjustable with the belt disposed thereover, a third pulley, means connecting the third pulley with the upper pulley to cause the third pulley to become adjusted with the upper pulley, a fourth pulley and a fifth pulley above the other pulleys, a sixth pulley below the upper pulley and the third, fourth and fifth pulleys, a belt disposed over the upper pulley and the third, fourth, fifth and sixth pulleys, whereby the belts are adapted to feed sheet material between them and to deliver the sheet material between the upper pulley and the third pulley, and whereby the point of delivery of the sheet material between the upper pulley and the third pulley is adjustable, means for guiding the vertical movement of the third pulley, and means connecting the second-named member with the third pulley to control the position of the said point of delivery in accordance with the height of the stack.

18. Apparatus of the character described comprising a table on a predetermined portion of which sheets may be stacked, a stop above and to one side of the said predetermined portion, means for feeding the sheets on to the table and against the stop to cause the sheets to become stacked on the table, means for raising the stop automatically in accordance with the height of the stack of sheets, and means for removing the stop and turning the table after the stacking thereon of a predetermined number of the sheets.

19. Apparatus of the character described comprising a table on a predetermined portion of which sheets may be stacked, a stop above and to one side of the said predetermined portion, means for feeding the sheets on to the table and against the stop to cause the sheets to become stacked on the table, means for raising the stop automatically in accordance with the height of the stack of sheets, means for removing the stop and turning the table after the stacking thereon of a predetermined number of the sheets, and means for restoring the stop after the table has been turned.

20. Apparatus of the character described comprising a table on a predetermined portion of which sheets may be stacked, a stop above and to one side of the said predetermined portion, a guide member extending at a downward incline toward the stop and integral with the stop, means for feeding the sheets under the guide member and against the stop to cause the sheets to become stacked, means for raising the guide member, the stop and the feeding means automatically in accordance with the height of the stack, means for removing the stop and turning the table after the stacking thereon of a predetermined number of the sheets, and means for restoring the stop after the table has been turned.

21. Apparatus of the character described comprising a member on which sheets may be stacked, a conveyor for feeding the sheets to the member, a member maintained by gravity in engagement with the topmast sheet of the stack and automatically raisable in opposition to the force exerted by gravity as the height of the stack increases, means connecting the portion of the conveyor that delivers the sheets to the first-named member with the second-named member to cause it to be raised with the second-named member in opposition to the force exerted by gravity in accordance with the height of the stack, and means for independently raising the second-named member and the said portion of the conveyor.

22. Apparatus of the character described comprising a member on a predetermined portion of which sheets may be stacked, a stop above and to one side of the said predetermined portion, means for feeding the sheets to the member, and a guide member extending from the feeding means toward the stop, the feeding means being constructed to feed the sheets under the guide member and against the stop to cause the sheets to become stacked on the member.

23. Apparatus of the character described comprising a member on a predetermined portion of which sheets may be stacked, a stop above and to one side of the said predetermined portion, a guide member extending toward the stop, means for feeding the sheets under the guide member and against the stop to cause the sheets to become stacked, and means for raising the guide member, the stop and the feeding means automatically in accordance with the height of the stack.

24. Apparatus for stacking sheets comprising a member freely movable vertically above the stack of sheets, means for pressing the member yieldingly against the topmost sheet of the stack, and means for feeding sheets to the top of the stack under the member to cause the sheets to become stacked, whereby the member becomes raised automatically in accordance with the height of the stack in opposition to the action of the yielding-pressing means as the sheets are fed thereunder.

25. Apparatus for stacking sheets comprising a member freely movable vertically above the stack of sheets and maintained by gravity on the topmost sheet of the stack, means for counterweighting the member, and means for feeding sheets to the top of the stack under the member to cause the sheets to become stacked, whereby the memebr becomes raised automatically in accordance with the height of the stack in cooperation with the action of the counterweight as the sheets are fed thereunder.

26. Apparatus for stacking sheets comprising a member freely movable vertically above the stack of sheets and provided with a stop, means for pressing the member yieldingly against the topmost sheet of the stack, and means for feeding sheets to the top of the stack under the member and against the stop to cause the sheets to become stacked, whereby the member becomes raised automatically in accordance with the height of the stack in opposition to the action of the yielding-pressing means as the sheets are fed thereunder.

27. Apparatus of the character described comprising a stacking support on which sheets may be stacked, a movable support biased toward the stack, a member movably carried by the movable support and normally maintained by reason of the bias in engagement with the topmost sheet of the stack, and means for raising the member with respect to the movable support above the topmost sheet of the stack and for preventing the movable support from moving by reason of the bias toward the stacking support while the member is so raised.

28. Apparatus of the character described comprising a stacking support on which sheets may be stacked, a movable support biased toward the stack, a member pivoted to the support, means normally maintaining the member by reason of the bias in engagement with the topmost sheet of the stack, and means for pivotally raising the member with respect to the movable support above the topmost sheet of the stack and for frictionally preventing the movable support from moving, by reason of the bias, toward the stacking support while the member is raised.

29. Apparatus of the character described comprising a table, means for feeding articles to the table, means for turning the table after a predetermined number of articles have been fed to the table, and means for automatically rendering the feeding means ineffective during the turning of the table.

30. Apparatus of the character described comprising a table on which sheets may be stacked, means for stacking sheets on the table, means for turning the table after the stacking thereon of a predetermined number of the sheets, a plurality of rolls below the table for removing the stack from the table, and means for lowering the table to lower the stack into contact with the rolls to enable the rolls to remove the stack from the table.

31. Apparatus of the character described comprising a member on a predetermined portion of which sheets may be stacked, a stop above and to one side of the said predetermined portion, a guide memebr extending at a downward incline toward the stop, means for feeding the sheets on to the first-named member from above the first-named member under the guide member and against the stop to cause the sheets to become stacked on the first-named member, means for raising the guide member automatically in accordance with the height of the stack of sheets, and means for further raising the guide member.

32. Apparatus of the character described comprising a member on a predetermined portion of which sheets may be stacked, a stop above and to one side of the said predetermined portion, a guide member extending at a downward incline toward the stop, means for feeding the sheets on to the first-named member from above the first-named member under the guide member and against the stop to cause the sheets to become stacked on the first-named member, means for raising the guide member automatically in accordance with the height of the stack of sheets, and means for pivotally moving the guide member.

33. Apparatus of the character described comprising a member on which sheets may be stacked, a conveyor for feeding the sheets to the member, a member maintained by gravity in engagement with the topmost sheet of the stack and automatically raisable in opposition to the force exerted by gravity as the height of the stack increases, means connecting the portion of the conveyor that delivers the sheets to the first-named member with the second-named member to cause 34. Apparatus of the character described comprising a hopper for containing a stack of sheets, a conveyor at one end of the hopper, there being an opening in the wall of the hopper near the conveyor to permit the conveyor to convey a sheet or sheets out of the hopper through the opening, a second conveyor to which the first-named conveyor conveys the sheets out of the hopper through the opening, a table on to which the second conveyor conveys the sheets received from the first-named conveyor, and means for closing the opening to prevent the conveyor from conveying sheets through the opening and for turning the table after a predetermined number of the sheets has been conveyed to the table by the second conveyor.

35. Apparatus of the character described comprising a hopper for containing a stack of sheets, a conveyor at one end of the hopper, there being an opening in the wall of the hopper near the conveyor to permit the conveyor to convey a sheet or sheets out of the hopper through the opening, a second conveyor to which the first-named conveyor conveys the sheets out of the hopper through the opening, a table on a predetermined portion of which sheets may be stacked as they are fed thereto by the second conveyor, a stop above and to one side of the said predetermined portion and against which the sheets are fed by the second conveyor to cause the sheets to become stacked on the table, means for closing the opening to prevent the conveyor from conveying sheets through the opening, and means for removing the stop and for turning the table after a predetermined number of the sheets has been fed to the table by the second conveyor.

36. Apparatus of the character described comprising a table on which articles may be collected, means for engaging the articles to remove the articles from the table, means for actuating the removing means to render the removing means effective, the table being normally disposed to one side of the removing means normally to maintain the articles out of engagement with the removing means, and means for relatively moving the table and the removing means to effect engagement of the articles by the removing means.

37. Apparatus of the character described comprising a table on which sheets may be stacked, means for stacking sheets on the table in substantially parallel planes, and means controlled by the stacking means for turning the table about an axis substantially at right angles to the planes of the sheets after the stacking thereon of a predetermined number of the sheets.

38. Apparatus of the character described comprising a table, means for feeding sheets to the table in groups of sheets with the planes of the sheets substantially parallel, and means controlled by the feeding means for turning the table about an axis substantially at right angles to the planes of the sheets after each of a plurality of groups of sheets has been fed thereto.

39. Apparatus of the character described comprising a table on which sheets may be stacked, means for stacking sheets on the table in substantially horizontal planes, means for turning the table after the stacking thereon of a predetermined number of the sheets, means for engaging the turned stack of sheets to remove the stack of sheets from the table, the table being normally disposed to one side of the removing means normally to maintain the stack of sheets out of engagement with the removing means, and means for relatively moving the table and the removing means to effect engagement of the stack of sheets by the removing means.

40. Apparatus of the character described comprising a support, means for stacking sheets on the support in groups of sheets with the planes of the sheets substantially parallel, means for rotating the support about an axis substantially at right angles to the planes of the sheets after the stacking thereon of each of a plurality of the groups of sheets, and means for varying the number of the groups of sheets.

41. Apparatus of the character described comprising a support, means for feeding to the support substantially centrally thereof in superposed relation a plurality of groups of sheets each having the same number of sheets, and means controlled by the feeding means at the end of the feeding of each group of sheets for turning the support through a half-revolution.

42. Apparatus of the character described comprising a support, means for feeding to the support substantially centrally thereof in superposed relation a plurality of groups of sheets each having the same number of sheets, means controlled by the feeding means at the end of the feeding of each group of sheets for turning the support through a half-revolution, and means for rendering the feeding means ineffective during the turning of the support.

43. Apparatus of the character described comprising a conveyor for conveying sheets, a second conveyor for receiving sheets from the first-named conveyor, a support to which the second conveyor feeds the sheets received from the first-named conveyor, a stop against which the sheets are fed by the second conveyor to cause the sheets to become stacked on the support, means for preventing the first-named conveyor from feeding sheets to the second conveyor at predetermined times, and means for removing the stop at the said predetermined times.

44. Apparatus of the character described comprising a support, means for stacking sheets on the support in superposed groups of sheets, means for turning the support, after the stacking thereon of each of a plurality of the groups of sheets, about an axis substantially at right angles to the planes of the sheets, and means for varying the number of sheets in one of the groups.

45. Apparatus of the character described comprising a support, means for feeding articles to the support, means for moving the support after a predetermined number of articles has been fed to the support, means for rendering the feeding means ineffective during the moving of the support, and means for varying the predetermined number.

46. Apparatus of the character described comprising a table, means for feeding sheets to the table in groups of sheets with the planes of the sheets substantially parallel, means controlled by the feeding means for turning the table about an axis substantially at right angles to the planes of the sheets after each of a plurality of groups of sheets has been fed thereto, and means for varying the number of sheets in one of the groups.

47. Apparatus of the character described comprising a table on which sheets may be stacked, means for stacking sheets on the table in substantially parallel planes, means controlled by the stacking means for turning the table about an axis substantially at right angles to the planes of the sheets after the stacking thereon of a predetermined number of the sheets, and means for varying the predetermined number.

48. Apparatus of the character described comprising a support, means for stacking sheets on the support in groups of sheets with the planes of the sheets substantially parallel, means for rotating the support about an axis substantially at right angles to the planes of the sheets after the stacking thereon of each of a plurality of the groups of sheets, and means for varying the number of sheets in one of the groups.

49. Apparatus of the character described comprising a support, a belt conveyor conveying sheets to and stacking them on the support in groups all of which, except one group, shall have the same number of sheets, and means for varying the number of sheets in the said one group.

50. Apparatus of the character described comprising means for stacking sheets in superposed groups all of which, except one group, shall have the same number of sheets, and means for varying the number of sheets in the said one group.

51. A machine of the character described comprising a support, means for conveying articles to and collecting them on the support, means for controlling the number of articles conveyed to and collected on the support, and means comprising a plurality of units elements and a plurality of multiples elements for adjusting the controlling means.

52. A machine of the character described comprising a support, a conveyor for conveying sheets to and stacking them on the support, means for controlling the number of sheets conveyed by the conveyor and stacked on the support, a switch member, means adapted to be actuated by the sheets as they are conveyed by the conveyor to control the switch member, and means cooperating with the switch member and comprising a plurality of units switches and a plurality of multiple switches for adjusting the controlling means.

53. A machine of the character described comprising a support, means for feeding sheets to the support, means for controlling the feeding means to cause the feeding means to feed the sheets to the support in superposed groups, means for interrupting the feed of the sheets to the support at the completion of the feeding thereto of each of one or more of the groups of sheets, and means for varying the size of one of the groups.

54. A machine of the character described comprising a support, means for feeding sheets to the support, means comprising a plurality of groups of controlling elements for controlling the feeding means to cause the feeding means to feed the sheets to the support in groups, one of the elements corresponding to each group of sheets to be fed to the support, and means for interrupting the feed of the sheets to the support at the completion of the feeding thereto of each of one or more of the groups of sheets.

55. A machine of the character described comprising a support, means for feeding sheets to the support, means for controlling the feeding means to cause the feeding means to feed the sheets to the support in superposed groups, and means for fixing the size of a plurality of the groups at a predetermined number and the size of one of the groups at a different predetermined number.

56. Apparatus of the character described comprising means for stacking sheets in superposed groups all of which, except one group, shall have the same number of sheets, and means for varying the number of sheets in the said one group.

57. A machine of the character decribed comprising a support, means for stacking sheets on the support in superposed groups of sheets, means for moving the support after the stacking thereon of each of one or more of the groups of sheets, and means for varying the size of one of the groups.

58. A machine of the character described comprising a support, means for conveying sheets to and stacking them on the support in groups of sheets with the planes of the sheets substantially parallel, means for turning the support about an axis substantially at right angles to the planes of the sheets after the stacking thereon of each of one or more of the successive groups of sheets, and means for varying the size of one of the groups.

59. A machine of the character described comprising a support, means for stacking sheets on the support in groups of sheets, means for turning the support after the stacking thereon of each of one or more of the groups of sheets, a controlling member, means for actuating the controlling member from an initial position to a second position to control the size of the groups, and means for varying one of the said positions to vary the size of a group.

60. A machine of the character described comprising a support, means for stacking sheets on the support in superposed groups of sheets, means for turning the support after the stacking thereon of each of one or more of the successive groups of the sheets, a controlling member, and means for controlling the controlling member to vary the size of one of the groups.

61. A machine of the character described comprising a support, means for stacking sheets on the support in superposed groups of sheets, means for turning the support after the stacking thereon of each of one or more of the successive groups of the sheets, a rotatable controlling member, and means for adjusting the degree of rotation of the controlling member to adjust the size of one of the groups.

62. A machine of the character described comprising a support, means for stacking sheets on the support in superposed groups of sheets, and means for controlling the size of one of the groups and the size of other groups.

63. Apparatus of the character described for feeding sheets in groups all the groups of which, except one group, shall have the same number of sheets, the said machine comprising means for feeding the sheets, means for rendering the feeding means ineffective at the end of the feeding of each of a plurality of the said groups of sheets, and means for varying the number of sheets in the said one group.

64. Apparatus of the character described for feeding sheets in groups all the groups of which, except one group, shall have the same number of sheets, the machine comprising means for feeding the sheets, a counter for counting the sheets, means controlled by the counter for rendering the feeding means ineffective at the end of the feeding of each of a plurality of the said groups of sheets, and means for varying the number of sheets in the said one group.

65. A machine of the character described comprising a support, means for stacking sheets on the support in superposed groups of sheets with the planes of the sheets substantially parallel, means for turning the support about an axis substantially at right angles to the planes of the sheets after the stacking thereon of each of a plurality of the groups of sheets, means for removing the sheets from the support after the stacking thereon of a predetermined number of groups of sheets, and means for varying the number of sheets in one of the groups.

66. A machine of the character described comprising a support, means for s'acking sheets on the support in groups of sheets, means for moving the support af'er the stacking thereon of each of a plurality of the groups of sheets, means for removing the sheets from the support after the stacking thereon of a predetermined number of groups of sheets, and means for varying the number of sheets in one of 'he groups.

67. A machine of the character described comprising a support, means for s'acking sheets on the support in groups of sheets, a controlling member, means for actuating the controlling member from an initial position to a variable second position corresponding to a variable predetermined number of groups of sheets, and means controlled by the controlling member in the second position to control the stacking on the support of that predetermined number of groups that corresponds to the said second variable position occupied by the controlling member.

68. A machine of the character described comprising a support, means for s'acking sheets on the support in groups of sheets, a plurality of controlling elements, each corresponding to a predetermined number of groups of sheets, and means coopera'ive with the controlling elements to control the stackings on the support of those predetermined numbers of groups that correspond to the controlling elements.

69. A machine of the character described comprising a support, means for s'acking sheets on the support in groups of sheets, an electric circuit, a controlling member, a plurality of contact members each corresponding to a predetermined number of groups of sheets, means for actuating the controlling member s'ep by step from an initial position toward a second position, one step corresponding to each group stacked on the support, and means controlled by the contact members and coopera'ive with the controlling member to control the stacking on the support of those predetermined numbers of groups that correspond to the said contac' members.

70. A machine of the character described comprising a support, means for s'acking sheets on the support in groups of sheets, two sets of controlling elements, the controlling elements of one of the sets each corresponding to a predetermined number of groups of sheets, the controlling elements of the other set each corresponding to a variable number of sheets in one of the groups, and means controlled by any of the controlling elements of the said one set to con'rol the stacking on the support of that predetermined number of groups that corresponds to the said controlling element.

71. A machine of the character described comprising means for feeding shee's, a rotatable counting wheel, means controlled by the sheets as they are fed for actuating the counting wheel, two main contact members rotatable from the counting wheel, two sets of cooperating con'act members, one for each main contact member, the contact members of one of the sets each corresponding to a predetermined number of groups of sheets, a support, means controlled by any of the contact members of one of the sets and cooperating with its main contact member for controlling the feeding to the support of that predetermined number of groups of sheets corresponding to the predetermined number of the said contact member, and means controlled by any of the contact members of the other set for varying the size of one of the groups.

72. A machine of the character described comprising a support, means for feeding sheets to the suppor' successively to form groups of sheets, means normally positioned in the line of feed of the sheets for guiding the sheets to the support, means for rendering the feeding means ineffective, thereby to stop the feeding of the shee's at the end of the feeding of each group of sheets, and means for thereupon moving the guiding means out of the line of feed, turning the support, re'urning the guiding means to its normal position in the line of feed, and then rendering the feeding means again effective.

73. Apparatus of the character described comprising a table on which sheets may be stacked, a stop, means for feeding the sheets to the table and against the stop to cause the sheets to become stacked on the table, means for raising the stop automatically in accordance with the height of the stack of sheets, means for removing the stop and turning the table after the stacking thereon of a predetermined number of the sheets, and means for varying the predetermined number.

74. Apparatus of the character described comprising a table on which sheets may be stacked, a stop, means for feeding groups of the sheets to the table and against the stop to cause the sheets to become stacked on the table in the said groups, means for raising the stop automatically in accordance with the height of the stack of sheets, means for removing the stop and turning the table after the stacking thereon of each group of sheets, means for restoring the stop after each turning of the table, and means for varying the number of sheets in one of the groups.

75. Apparatus of the character described comprising a table on which sheets may be stacked, a stop, a guide member extending at a downward incline toward the stop and integral with the stop, means for feeding groups of the sheets under the guide member and against the stop to cause the sheets to become stacked on the table in the said groups, means for raising the guide member, the stop and the feeding means automatically in accordance with the height of the stack, means for removing the stop and turning the table after the stacking thereon of each group of shee's, means for restoring the stop after each turning of the table, and means for varying the number of sheets in one of the groups.

76. Apparatus of the character described comprising means for feeding shee's, an electric system for controlling the feeding means, a units controlling element, a multiple controlling element, means controlled by the units controlling element for actuating the multiple controlling element at the end of a predetermined operation of the units controlling element, an electric system, a plurality of controlling elemen's cooperat've with the units controlling element, a second plurality of controlling elements cooperative with the multiple-controlling element, and means controlled by the units and multiple controlling elements as controlled by the said pluralities of controlling elements for rendering the electric system effective to render the feeding means ineffective at the end of the feeding of a predetermined number of the sheets.

77. A machine of the character described comprising a support, means for feeding sheets to the support successively to form groups of sheets, means normally positioned in the line of feed of the sheets for guiding the sheets to the support, means for rendering the feeding means ineffective, thereby to stop the feeding of the sheets, at the end of the feeding of each group of sheets and operable at the end of the feeding of each group of sheets to move the guiding means out of the line of feed, turn the support, return the guiding means to its normal position in the line of feed, and render the feeding means again effective.

78. A machine of the character described comprising a support, means for feeding sheets to the support successively to form groups of sheets, means for rendering the feeding means ineffective, thereby to stop the feeding of the sheets, at the end of the feeding of each of a plurality of the groups of sheets, means thereupon operable to turn the support and then render the feeding means again effective, means for removing the sheets from the support, and means for thereafter rendering the feeding means again effective.

79. A machine of the character described comprising a support normally occupying a predetermined position, means for feeding sheets to the support successively to form groups of sheets, means normally positioned in the line of feed of the sheets for guiding the sheets to the support, means for rendering the feeding means ineffective, thereby to stop the feeding of the sheets, at the end of the feeding of each of a plurality of the groups of sheets, means thereupon operable to move the guiding means out of the line of feed, turn the support, return the guiding means to its normal position in the line of feed, and then render the feeding means again effective, and means operable at the end of the feeding of all of the groups of sheets to move the guiding means out of the line of feed, move the support out of the said predetermined position to permit removal of the sheets therefrom, restore the support to its said predetermined position, and restore the guiding means to its normal position in the line of feed.

80. A machine of the character described comprising a support, means for feeding sheets to the support successively to form groups of sheets, means for rendering the feeding means ineffective, thereby to stop the feeding of the sheets, at the end of the feeding of each of a plurality of the groups of sheets, a selector adapted normally to occupy an initial position, means controlled in accordance with the feeding of the sheets for actuating the selector out of the initial position, and means for actuating the selector to the initial position.

81. A machine of the character described comprising a support normally occupying a predetermined position, means for feeding sheets to the support successively to form groups of sheets, means for rendering the feeding means ineffective, thereby to stop the feeding of the sheets, at the end of the feeding of each group of sheets, means for actuating the support out of the predetermined position and returning it to the predetermined position, and means operative upon the actuation of the support out of the predetermined position to remove the sheets from the support.

82. A machine of the character described comprising a support, means for stacking sheets on the support in groups of sheets, a plurality of controlling elements each corresponding to a predetermined number of groups of sheets, a selector adapted to occupy an initial position, means controlled in accordance with the feeding of the sheets for actuating the selector to a second position, means controlled by any of the controlling elements and the selector in the said second position to control the stacking on the support of that predetermined number of groups that corresponds to the respective controlling elements, and means for actuating the selector to its initial position.

83. A machine of the character described comprising a support normally occupying a predetermined position, means for feeding sheets to the support successively to form groups of sheets, means for rendering the feeding means ineffective, thereby to stop the feeding of the sheets, at the end of the feeding of each group of sheets, a plurality of controlling elements, means controlled by the controlling elements to control the size of one of the groups, means for actuating the support out of the predetermined position and returning it to the predetermined position, and means operative upon the actuation of the support out of the predetermined position to remove the sheets from the support.

84. A machine of the character described comprising a support, means for stacking sheets on the support in groups of sheets, an electric circuit, a controlling contact member, a plurality of cooperating contact members, means for actuating the controlling contact member step by step, one step corresponding to each sheet stacked on the support, and means connecting the controlling contact member into circuit with the cooperating contact members to effect turning of the support upon the stacking of each group on the support.

85. A machine of the character described comprising a support, means for feeding sheets to the support, means for controlling the feeding means to cause the feeding means to feed the sheets to the support in superposed groups, means for interrupting the feeding of the sheets to the support at the completion of the feeding thereto of each group of sheets, and means for stopping the feed of the sheets at any time manually.

86. Apparatus of the character described comprising a hopper for containing a stack of sheets and having an opening, a conveyor for conveying a sheet or sheets out of the hopper through the opening, a table on to which the conveyor conveys the sheets conveyed out of the hopper, and means for closing the opening to prevent the conveyer from conveying sheets therethrough and for turning the table after a predetermined number of the sheets has been conveyed to the table by the conveyor.

87. Apparatus of the character described comprising a conveyor for conveying sheets, a second conveyor for receiving sheets from the first-named conveyor, a support to which the second conveyor feeds the sheets received from the first-named conveyor, a stop against which the sheets are fed by the second conveyor to cause the sheets to become stacked on the support, means for preventing the first-named conveyor from feeding sheets to the second conveyor at predetermined times, and means for removing the stop at the said predetermined times.

88. Apparatus of the character described comprising means for stacking sheets, means for controlling the number of sheets stacked comprising a plurality of units elements and a plurality of multiple elements, and means for moving the stacked sheets as a unit.

OTTO E. WOLFF.